US012190006B2

(12) United States Patent
Nishida et al.

(10) Patent No.: US 12,190,006 B2
(45) Date of Patent: Jan. 7, 2025

(54) IMAGE PROCESSING DEVICE THAT PERFORMS IMAGE PROCESSING WHEN A POSITION OF A TERMINAL DEVICE IS WITHIN A PREDETERMINED RANGE

(71) Applicant: SEIKO EPSON CORPORATION, Tokyo (JP)

(72) Inventors: Kota Nishida, Shiojiri (JP); Hiroyuki Kuramoto, Shiojiri (JP); Yui Imamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/455,064

(22) Filed: Aug. 24, 2023

(65) Prior Publication Data
US 2024/0069840 A1 Feb. 29, 2024

(30) Foreign Application Priority Data
Aug. 25, 2022 (JP) ................................ 2022-133912

(51) Int. Cl.
*G06F 3/12* (2006.01)
(52) U.S. Cl.
CPC .......... *G06F 3/1292* (2013.01); *G06F 3/1203* (2013.01); *G06F 3/1222* (2013.01); *G06F 3/1237* (2013.01); *G06F 3/126* (2013.01); *G06F 3/1293* (2013.01); *G06F 3/1286* (2013.01)

(58) Field of Classification Search
None
See application file for complete search history.

(56) References Cited

U.S. PATENT DOCUMENTS

| 2020/0218814 | A1* | 7/2020 | Rothenbuhler | ....... G06F 3/1285 |
| 2020/0356330 | A1* | 11/2020 | Yamagishi | ............ G06F 3/1219 |
| 2021/0037149 | A1 | 2/2021 | Nagahara | |

FOREIGN PATENT DOCUMENTS

JP 2021-024120 A 2/2021

* cited by examiner

*Primary Examiner* — Thomas D Lee
(74) *Attorney, Agent, or Firm* — WORKMAN NYDEGGER

(57) ABSTRACT

A distance information acquisition unit acquires distance information representing a distance between a terminal device and an image processing device, based on a radio wave arriving from the terminal device. A direction information acquisition unit acquires direction information representing a direction of the terminal device in relation to the image processing device, based on the radio wave arriving from the terminal device. A controller performs processing to perform image processing, based on the distance information and the direction information. The controller performs processing to perform image processing, when a position of the terminal device is within a predetermined range in relation to the image processing device and a rate of change in at least one of the distance from the terminal device and the direction of the terminal device is equal to or lower than a threshold.

10 Claims, 15 Drawing Sheets

| JOB IDENTIFICATION INFORMATION | USER IDENTIFICATION INFORMATION | WITH OR WITHOUT AUTHENTICATION PROCESSING |
|---|---|---|
| JOB A | USER A | WITH AUTHENTICATION |
| JOB B | USER B | WITHOUT AUTHENTICATION |
| ... | ... | ... |

| USER IDENTIFICATION INFORMATION | DEVICE IDENTIFICATION INFORMATION | |
|---|---|---|
| USER A | TERMINAL #1 | PC#1 |
| USER B | TERMINAL #2 | PC#2 |
| ... | ... | ... |

IMAGE PROCESSING DEVICE THAT PERFORMS IMAGE PROCESSING WHEN A POSITION OF A TERMINAL DEVICE IS WITHIN A PREDETERMINED RANGE

The present application is based on, and claims priority from JP Application Serial Number 2022-133912, filed Aug. 25, 2022, the disclosure of which is hereby incorporated by reference herein in its entirety.

BACKGROUND

1. Technical Field

The present disclosure relates to an image processing device, a control method, and a non-transitory computer-readable storage medium storing a program.

2. Related Art

JP-A-2021-24120 discloses a printing device that receives a signal from another device. The printing device according to JP-A-2021-24120 acquires a direction of arrival and an intensity of reception of a signal received from another device and executes predetermined processing for printing, based on the direction of arrival and the intensity of reception thus acquired.

In the technique according to JP-A-2021-24120, the printing device may execute printing by mistake even when a user simply passes by in front of the printing device. That is, in the technique according to JP-A-2021-24120, printing may be executed even when the user passes by in front of the printing device at a timing when the user does not wish the execution of printing. Therefore, the technique according to JP-A-2021-24120 may reduce the convenience for the user.

SUMMARY

According to an aspect of the present disclosure, an image processing device communicatively connected to at least one terminal device is provided. The image processing device includes: a distance information acquisition unit that acquires distance information representing a distance between the terminal device and the image processing device, based on a radio wave arriving from the terminal device; a direction information acquisition unit that acquires direction information representing a direction of the terminal device in relation to the image processing device, based on the radio wave arriving from the terminal device; and a control unit that performs processing to perform image processing, when a position of the terminal device is within a predetermined range that is determined in advance in relation to the image processing device and a rate of change in at least one of the distance from the terminal device and the direction of the terminal device is equal to or lower than a threshold that is determined in advance, based on the distance information and the direction information.

According to another aspect of the present disclosure, a control method executed by an image processing device communicatively connected to at least one terminal device is provided. The control method includes: acquiring distance information representing a distance between the terminal device and the image processing device, based on a radio wave arriving from the terminal device; acquiring direction information representing a direction of the terminal device in relation to the image processing device, based on the radio wave arriving from the terminal device; and performing processing to perform image processing, when a position of the terminal device is within a predetermined range that is determined in advance in relation to the image processing device and a rate of change in at least one of the distance from the terminal device and the direction of the terminal device is equal to or lower than a threshold that is determined in advance, based on the distance information and the direction information.

According to still another aspect of the present disclosure, a non-transitory computer-readable storage medium storing a program is provided. The program implements a control method executed by an image processing device communicatively connected to at least one terminal device. The program causes a computer to execute: acquiring distance information representing a distance between the terminal device and the image processing device, based on a radio wave arriving from the terminal device; acquiring direction information representing a direction of the terminal device in relation to the image processing device, based on the radio wave arriving from the terminal device; and performing processing to perform image processing, when a position of the terminal device is within a predetermined range that is determined in advance in relation to the image processing device and a rate of change in at least one of the distance from the terminal device and the direction of the terminal device is equal to or lower than a threshold that is determined in advance, based on the distance information and the direction information.

DESCRIPTION OF EMBODIMENTS

Embodiment 1

Figure 1:
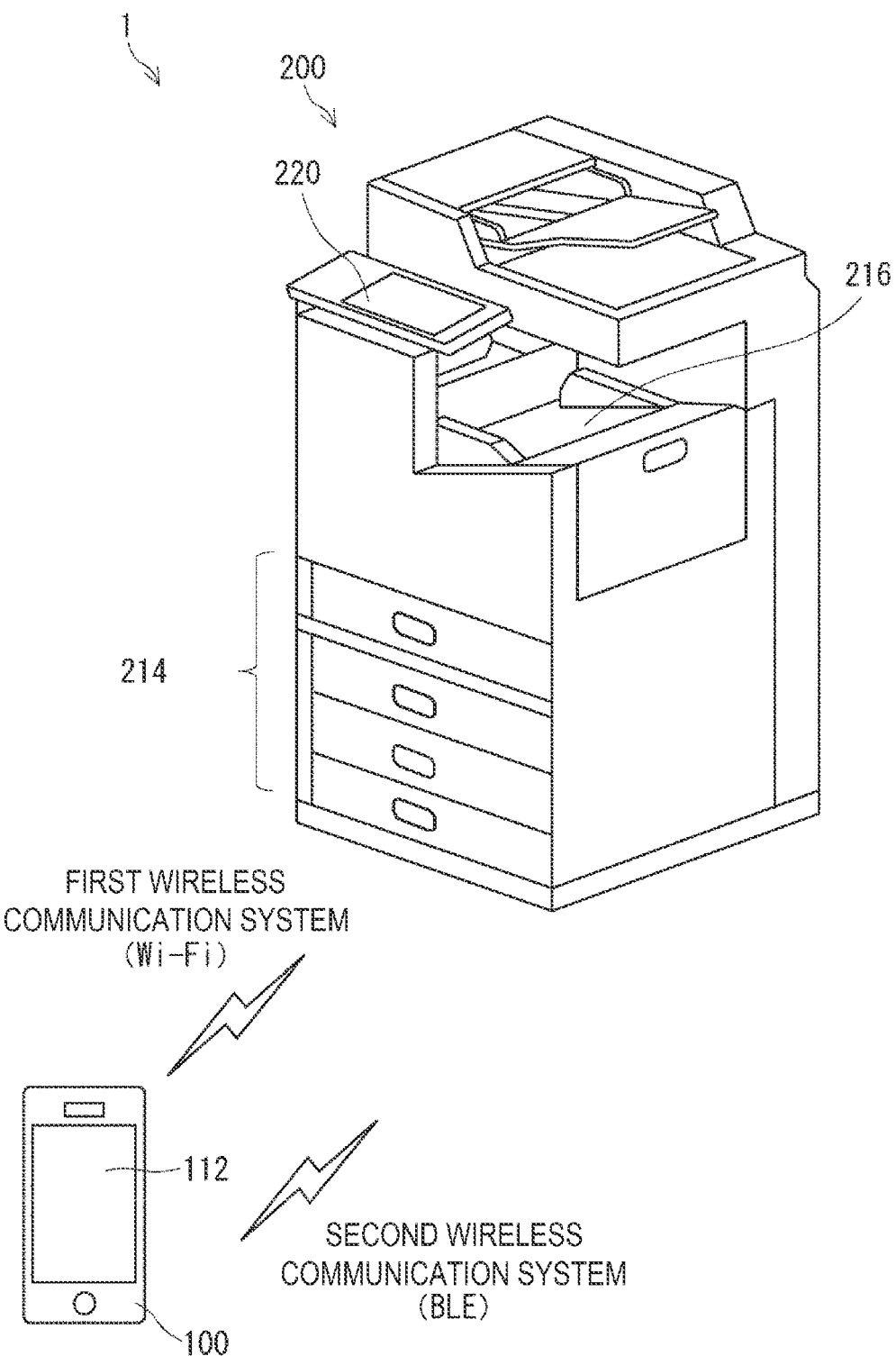
FIG. 1 shows an image processing system according to Embodiment 1.

An embodiment will now be described with reference to the drawings. In order to clarify the explanation, suitable omissions and simplifications are made in the description and drawings given below. In the drawings, the same elements are denoted by the same reference sign and the repeated description thereof is omitted according to need.

Figure 2:
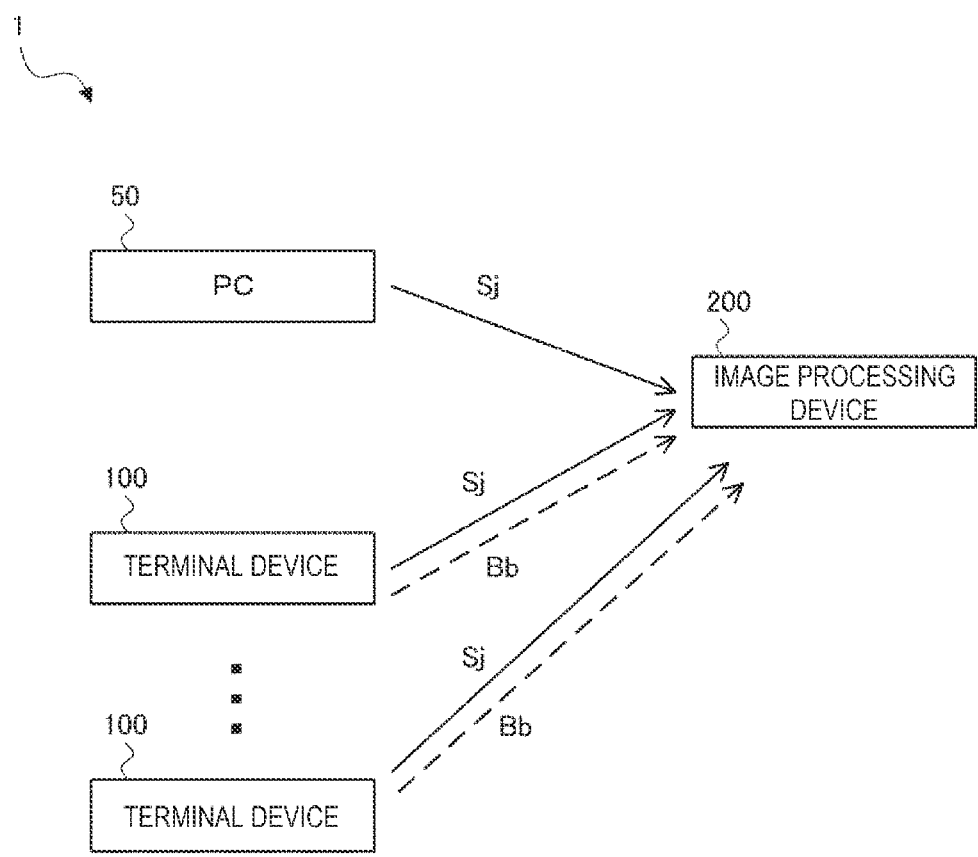
FIG. 2 shows the image processing system according to Embodiment 1.

FIGS. 1 and 2 show an image processing system 1 according to Embodiment 1. The image processing system 1 has a terminal device 100 and an image processing device 200. As shown in FIG. 2, the image processing system 1 may have a PC 50 (personal computer). The PC 50 may be, for example, a desktop computer device.

The terminal device 100 is, for example, a portable terminal device such as a smartphone or a tablet terminal. The terminal device 100 may also be a computer device such as a portable laptop PC. The terminal device 100 has at least a display unit 112. The other components of the terminal device 100 will be described later.

The image processing device 200 performs image processing designated by a user. The image processing device 200 is, for example, a printer. The image processing device 200 may also be, for example, a multifunction peripheral (MFP), a copy machine, or a scanner or the like. Also, a multifunction peripheral having a print function is an example of a printer. In Embodiment 1, a case where the image processing device 200 is, for example, a printer such as a multifunction peripheral, is described. The image processing device 200, which is a printer, performs image forming processing of forming an image on a print medium such as a paper, that is, print processing, as image processing. However, the image processing device 200 may perform image processing other than the image forming processing. For example, the image processing device 200 may perform image processing such as copying or scanning.

As shown in FIG. 1, the image processing device 200, which is a printer, has at least an operation panel 220, a paper feed tray 214, and a paper discharge tray 216. The operation panel 220 is, for example, a touch panel formed of a display device and an input device integrated together. The paper feed tray 214 stores a paper, which is a print medium, for example, by paper size. A paper with an image formed thereon is discharged onto the paper discharge tray 216. The other components of the image processing device 200 will be described later.

The terminal device 100 and the image processing device 200 communicate with each other via wireless communication by a first wireless communication system and via wireless communication by a second wireless communication system. The first wireless communication system is a standard with a higher communication speed and a longer communication distance than the second wireless communication system. In a narrow sense, the first wireless communication system is a wireless LAN (local area network), and more specifically, Wi-Fi (trademark registered). In the description below, an example where the first wireless communication system is Wi-Fi is described. However, another communication system may be employed as the first wireless communication system.

The second wireless communication system is a standard with a lower communication speed and a shorter communication distance than the first wireless communication system. Therefore, the second wireless communication system is a standard that implements short-range wireless communication. The second wireless communication system is also a standard that enables transmission of a beacon signal. In a narrow sense, the second wireless communication system is Bluetooth (trademark registered), and more specifically, BLE (Bluetooth Low Energy). In the description below, an example where the second wireless communication system is BLE is described. However, another communication system may be employed as the second wireless communication system. A beacon signal of BLE corresponds to an advertisement packet. Also, the first wireless communication system may enable the transmission of a beacon signal. When the first wireless communication system is Wi-Fi, the image processing device 200 may transmit a beacon signal that notifies a device in the periphery, of the SSID (service set identifier) of the image processing device 200 itself.

FIG. 2 shows an example of the image processing system 1 having a plurality of terminal devices 100. The image processing system 1 may have a plurality of PCs 50. The image processing system 1 may have a plurality of image processing devices 200. The image processing system 1 may have one terminal device 100. That is, the image processing system 1 has at least one terminal device 100.

The image processing device 200 is communicatively connected to the PC 50 via wired or wireless communication. The image processing device 200 is also communicatively connected to at least one terminal device 100 via wireless communication. The foregoing wireless communication may be, for example, by the first wireless communication system.

When the image processing device 200 is communicatively connected to the terminal device 100 via wireless communication, the image processing device 200 may be connected to the terminal device 100 via an access point such as a wireless LAN access point. In this case, when the image processing device 200 operates in an infrastructure mode and is connected to an access point, the terminal device 100 is wirelessly connected to the access point. Thus, the wireless communication between the terminal device 100 and the image processing device 200 is executed. Such connection is referred to as infrastructure connection.

Alternatively, the image processing device 200 may be directly connected to the terminal device 100 without using an access point. In this case, the image processing device 200 activates an internal access point and the terminal device 100 is connected to the internal access point. Thus, the communication between the terminal device 100 and the image processing device 200 is directly executed. Such connection is referred to as direct connection. The direct connection between the terminal device 100 and the image processing device 200 may be made by communication conforming to the WFD (Wi-Fi Direct) standard or may be made using a Wi-Fi ad hoc mode.

The image processing device 200 making direct connection transmits (or broadcasts) a Wi-Fi beacon including the SSID. The Wi-Fi beacon is a beacon signal conforming to the Wi-Fi standard. When the terminal device 100 receives the Wi-Fi beacon, the SSID included in the Wi-Fi beacon is displayed. Also, at this point, the SSID and a password for connection are displayed on the operation panel 220 of the image processing device 200. The user of the terminal device 100 sets the SSID and the password displayed on the operation panel 220 into the user's own terminal device 100. Thus, the terminal device 100 is direct-connected to the image processing device 200.

The PC 50 and the terminal device 100 transmit a job signal Sj including information about a job such as a print job, to the image processing device 200. The job signal Sj includes a job execution instruction to execute the job. The job signal Sj for a print job includes a print instruction to perform printing. The job signal Sj for a print job also includes print data and identification information of the user of the device (PC 50 or terminal device 100) transmitting the job signal Sj. The "print data" is data representing an image to be printed on a paper. The identification information included in the job signal Sj may be identification information of the device (PC 50 or terminal device 100) transmitting the job signal Sj. The job signal Sj may also include information indicating whether to perform authentication processing when executing the job or not.

The image processing device 200 receives the job signal Sj, executes the job relating to the received job signal Sj, and thus performs image processing. When the job signal Sj is for a print job, the image processing device 200 performs printing in such a way as to form an image corresponding to the print data included in the print job onto a print medium such as a paper. The print medium with the image corresponding to the print data formed thereon is discharged to the paper discharge tray 216.

The terminal device 100 also transmits (or broadcasts) a BLE beacon Bb corresponding to the second wireless communication system. The BLE beacon Bb is a beacon signal conforming to the BLE standard. By receiving the BLE beacon Bb, the image processing device 200 can acquire distance information representing the distance from the image processing device 200 to the terminal device 100. By receiving the BLE beacon Bb, the image processing device 200 can also acquire direction information representing the direction of the terminal device 100 in relation to the image processing device 200. Details of this will be described later. The direction information can be acquired, for example, when the image processing device 200 and the terminal device 100 are in conformity with the Bluetooth standard from version 5.1 onward.

Figure 3:
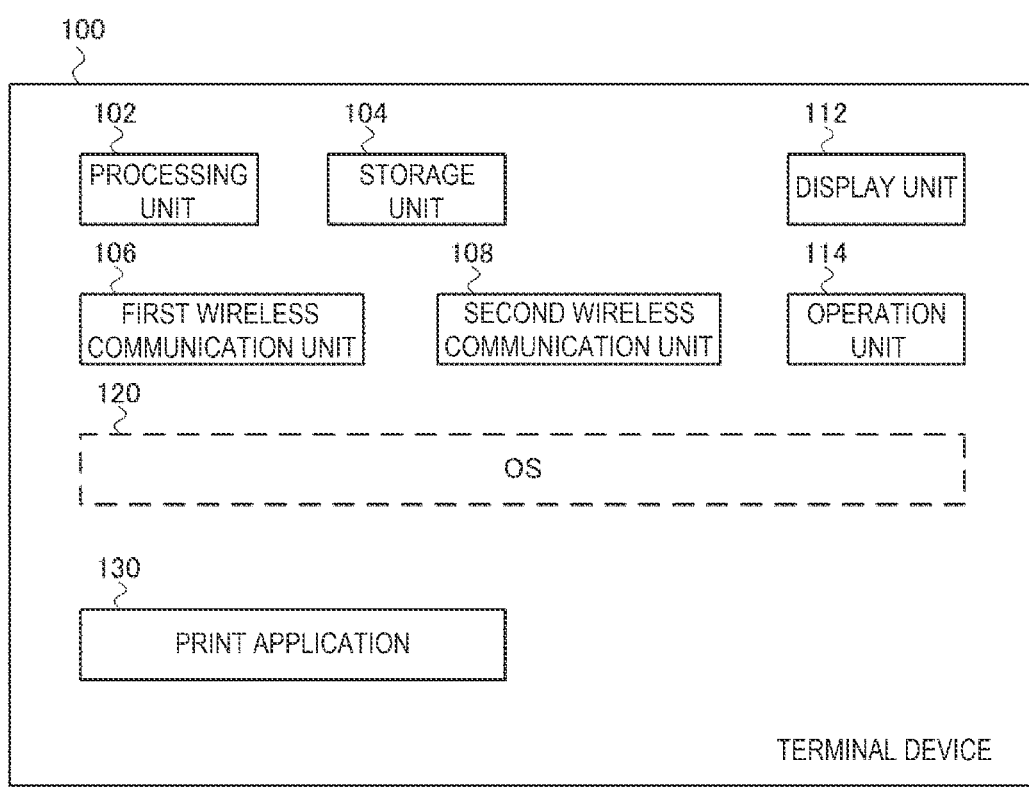
FIG. 3 shows the configuration of a terminal device according to Embodiment 1.

FIG. 3 shows the configuration of the terminal device 100 according to Embodiment 1. The PC 50, too, may have the configuration shown in FIG. 3. The terminal device 100 has a processing unit 102, a storage unit 104, a first wireless communication unit 106, a second wireless communication unit 108, the display unit 112, and an operation unit 114, as a main hardware configuration. The processing unit 102, the storage unit 104, the first wireless communication unit 106, the second wireless communication unit 108, the display unit 112, and the operation unit 114 may be coupled to each other via a data bus or the like.

The processing unit 102 is, for example, a processor such as a CPU (central processing unit). The processing unit 102 may have a plurality of processors. The processing unit 102 has functions as a computing device that performs control processing and computational processing or the like. The processing unit 102 controls the storage unit 104, the first wireless communication unit 106, the second wireless communication unit 108, the display unit 112, and the operation unit 114.

The storage unit 104 is, for example, a storage device such as a memory or a hard disk. The storage unit 104 is, for example, a ROM (read-only memory) or a RAM (random-access memory) or the like. The storage unit 104 has a function for storing a control program and a computation program or the like to be executed by the processing unit 102. The storage unit 104 also has a function for temporarily storing processing data or the like. The storage unit 104 may include a database.

The first wireless communication unit 106 is a wireless communication device that executes wireless communication conforming to the first wireless communication system. The first wireless communication unit 106 executes, for example, wireless communication conforming to the Wi-Fi standard. The first wireless communication unit 106 transmits and receives a radio wave conforming to the first wireless communication system such as the Wi-Fi standard. The second wireless communication unit 108 is a wireless communication device that executes wireless communication conforming to the second wireless communication system. The second wireless communication unit 108 executes, for example, wireless communication conforming to the BLE standard. The second wireless communication unit 108 transmits and receives a radio wave conforming to the second wireless communication system such as the BLE standard.

The display unit 112 and the operation unit 114 are user interfaces. The display unit 112 is formed of a display or the like that displays various information to the user. The operation unit 114 is formed of a button or the like that accepts an input operation from the user. The display unit 112 and the operation unit 114 may be integrated together into a touch panel or the like.

The terminal device 100 also has an OS 120 (operating system), which is basic software, and a print application 130, as a software configuration. The print application 130 is application software that operates using functions of the OS 120.

The print application 130 can be implemented, for example, by causing a program to be executed under the control of the processing unit 102. More specifically, the print application 130 can be implemented by the processing unit 102 executing the program stored in the storage unit 104. Also, a necessary program may be recorded in any non-volatile recording medium and installed according to need, thus implementing the print application 130.

The print application 130 is not limited to being implemented by program-based software and may also be implemented by a combination of any ones of hardware, firmware, and software, or the like. The print application 130 may also be implemented, for example, using an integrated circuit that is programmable by the user, such as an FPGA (field-programmable gate array) or a microcomputer. In this case, a program formed of the print application 130 may be implemented, using this integrated circuit.

The print application 130 may perform processing to communicatively connect the terminal device 100 and the image processing device 200 to each other. In this case, the print application 130 may control the first wireless communication unit 106 to perform the processing to communicatively connect the terminal device 100 and the image processing device 200 to each other. The print application 130 may also perform processing to transmit the BLE beacon. In this case, the print application 130 may perform processing in such a way as to control the second wireless communication unit 108 to transmit the BLE beacon.

The print application 130 performs control to cause the connected image processing device 200 (printer) to execute printing. When the print application 130 accepts a print instruction based on an operation by the user, the print application 130 performs processing in such a way as to transmit a job signal for a print job including print data, to the connected image processing device 200. In this case, the print application 130 may perform processing in such a way as to control the first wireless communication unit 106 to transmit the job signal.

Figure 4:
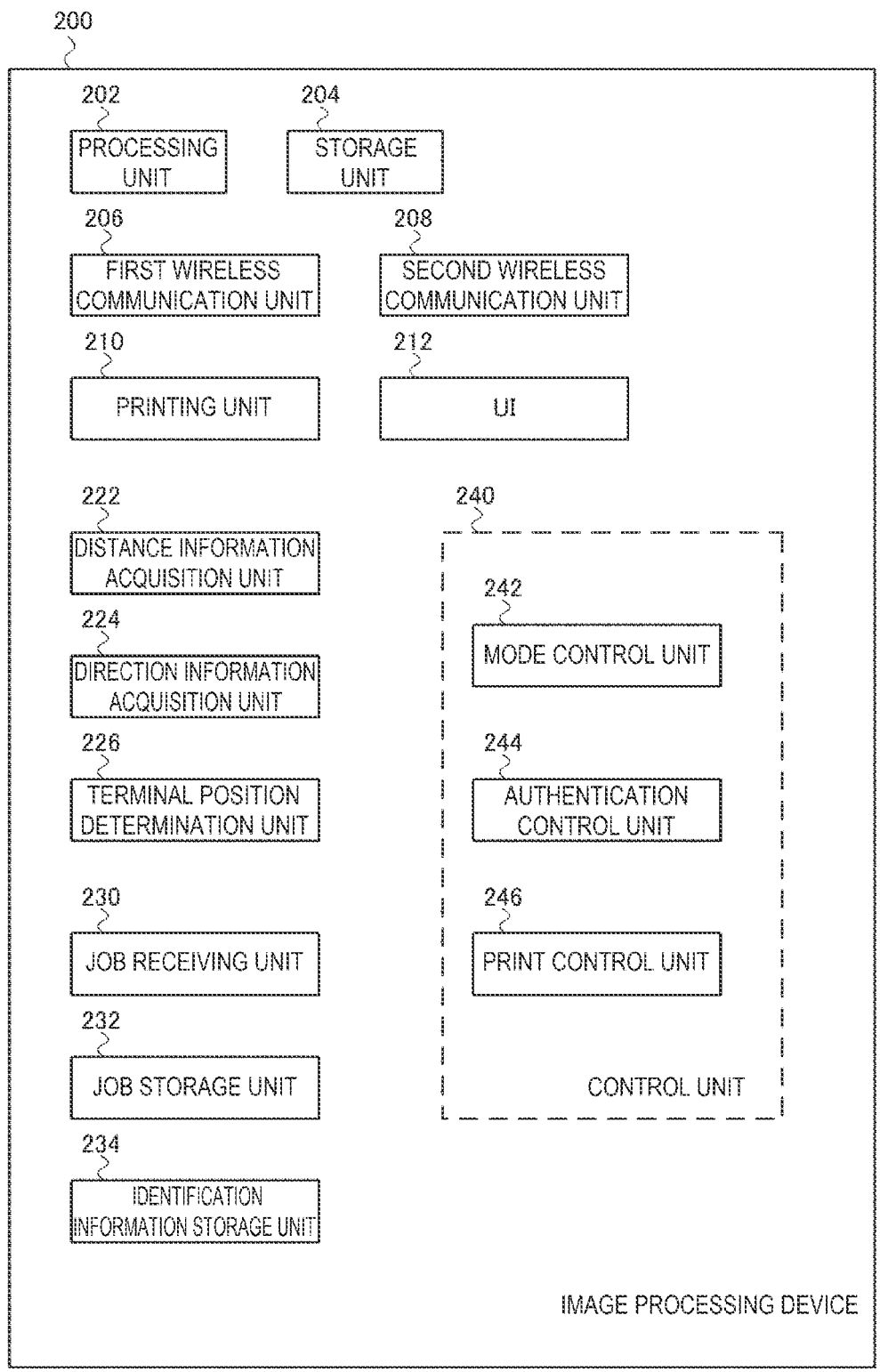
FIG. 4 shows the configuration of an image processing device according to Embodiment 1.

FIG. 4 shows the configuration of the image processing device 200 according to Embodiment 1. FIG. 4 shows a case where the image processing device 200 is a printer. The image processing device 200 has a processing unit 202, a storage unit 204, a first wireless communication unit 206, a second wireless communication unit 208, a printing unit 210, and a user interface 212 (UI). The processing unit 202, the storage unit 204, the first wireless communication unit 206, the second wireless communication unit 208, the printing unit 210, and the user interface 212 may be coupled to each other via a data bus or the like.

The processing unit 202 is, for example, a processor such as a CPU. The processing unit 202 may have a plurality of processors. The processing unit 202 has functions as a computing device that performs control processing and computational processing or the like. The processing unit 202 controls the storage unit 204, the first wireless communication unit 206, the second wireless communication unit 208, the printing unit 210, and the user interface 212.

The storage unit 204 is, for example, a storage device such as a memory or a hard disk. The storage unit 204 is, for example, a ROM or a RAM or the like. The storage unit 204 has a function for storing a control program and a computation program or the like to be executed by the processing unit 202. The storage unit 204 also has a function for temporarily storing processing data or the like. The storage unit 204 may include a database.

The first wireless communication unit 206 is a wireless communication device that executes wireless communication conforming to the first wireless communication system. The first wireless communication unit 206 executes, for example, wireless communication conforming to the Wi-Fi standard. The first wireless communication unit 206 transmits and receives a radio wave conforming to the first wireless communication system such as the Wi-Fi standard. The second wireless communication unit 208 is a wireless communication device that executes wireless communication conforming to the second wireless communication system. The second wireless communication unit 208 executes, for example, wireless communication conforming to the BLE standard. The second wireless communication unit 208 transmits and receives a radio wave conforming to the second wireless communication system such as the BLE standard.

The first wireless communication unit 206 of the image processing device 200 making the foregoing direct connection may activate the internal access point according to a predetermined connection setting. In this case, the first wireless communication unit 206 accepts a connection request from the terminal device 100. The connection setting is, for example, the setting of an SSID and a passphrase or the setting of a communication frequency band. The setting of a communication frequency band corresponds to the channel setting.

The printing unit 210 has a print function to form an image on a paper, that is, a print medium. The printing unit 210 includes a print engine. The print engine is a mechanical configuration to execute printing of an image onto a print medium. The print engine may have, for example, a mechanism that performs printing with a toner by an electrophotographic method. Alternatively, the print engine may have, for example, a mechanism that performs printing by an inkjet method. The print engine may also have a conveyor mechanism that conveys the print medium.

The user interface 212 has an input device such as a button, a keyboard, a touch panel or a mouse, and an output device such as a display or a speaker. The user interface 212 may be formed of an input device and an output device integrated together. The user interface 212 accepts a data input operation from the user and outputs information to the user. The user interface 212 includes the foregoing operation panel 220.

The image processing device 200 also has, as component elements, a distance information acquisition unit 222, a direction information acquisition unit 224, a terminal position determination unit 226, a job receiving unit 230, a job storage unit 232, an identification information storage unit 234, and a control unit 240. The control unit 240 has a mode control unit 242, an authentication control unit 244, and a print control unit 246.

The foregoing component elements can be implemented, for example, by causing a program to be executed under the control of the processing unit 202. More specifically, the component elements can be implemented by the processing unit 202 executing the program stored in the storage unit 204. Also, a necessary program may be recorded in any non-volatile recording medium and installed according to need, thus implementing the component elements.

The component elements are not limited to being implemented by program-based software and may also be implemented by a combination of any ones of hardware, firmware, and software, or the like. The component elements may also be implemented, for example, using an integrated circuit that is programmable by the user, such as an FPGA or a microcomputer. In this case, a program formed of the foregoing component elements may be implemented, using this integrated circuit.

The distance information acquisition unit 222 acquires distance information representing the distance between the terminal device 100 and the image processing device 200, based on a radio wave arriving from the terminal device 100. The distance information acquisition unit 222 acquires the distance information by short-range wireless communication with the terminal device 100. Details of this will be described later.

The direction information acquisition unit 224 acquires direction information representing the direction of the terminal device 100 in relation to the image processing device 200, based on the radio wave arriving from the terminal device 100. The direction information acquisition unit 224 acquires the direction information by short-range wireless communication with the terminal device 100. Details of this will be described later.

The terminal position determination unit 226 determines whether the position of the terminal device 100 is within a predetermined range that is determined in advance in relation to the image processing device 200 or not, using the distance information and the direction information of the terminal device 100. At this point, the terminal position determination unit 226 may determine whether the distance between the terminal device 100 and the image processing device 200 is equal to or shorter than a threshold that is determined in advance, or not. Also, at this point, the terminal position determination unit 226 may determine whether the direction of the terminal device 100 in relation to the image processing device 200 is within a predetermined range or not. Details of this will be described later.

The terminal position determination unit 226 also determines whether the rate of change (change) in the position of the terminal device 100 is equal to or lower than a threshold that is determined in advance or not, using the distance information and the direction information of the terminal device 100. That is, the terminal position determination unit 226 determines whether the rate of change in at least one of the distance from the terminal device 100 and the direction of the terminal device 100 is equal to or lower than a threshold that is determined in advance or not. At this point, the terminal position determination unit 226 may determine whether at least the rate of change in the direction of the terminal device 100 is equal to or lower than a threshold that is determined in advance or not. The terminal position determination unit 226 may also determine whether the rate of change in the distance from the terminal device 100 is equal to or lower than a threshold that is determined in advance or not.

The terminal position determination unit 226 may also determine whether the state where the rate of change in at least one of the distance from the terminal device 100 and the direction of the terminal device 100 is equal to or lower than a threshold that is determined in advance has continued for a predetermined time that is determined in advance or not. Details of this will be described later.

The job receiving unit 230 receives a job signal for a job such as a print job from the terminal device 100 or the PC 50. The job receiving unit 230 may receive the job signal from the terminal device 100 via the first wireless communication unit 206.

The job storage unit 232 stores (or accumulates) job information, which is information about the job relating to the received job signal. At this point, the job storage unit 232 stores the job, establishing the correspondence between the identification information of the job and the identification information of the user giving an instruction to execute the job. That is, the identification information of the user is made to correspond to the job for image processing. The job storage unit 232 stores the job information to be stored, as job accumulation information.

Figure 5:
FIG. 5 shows an example of job accumulation information stored in a job storage unit according to Embodiment 1.

FIG. 5 shows an example of job accumulation information TbJ stored in the job storage unit 232 according to Embodiment 1. As illustrated in FIG. 5, in the job accumulation information TbJ, job identification information, user identification information, and whether it is with or without authentication processing, are corresponded. In this case, the "job identification information" is the identification information of the corresponding job. The "user identification information" is the identification information of the user giving an instruction to execute the corresponding job.

"Whether it is with or without authentication processing" is information indicating whether to perform authentication processing when executing the job or not. That is, with respect to the job for image processing, whether it is with or without authentication processing is designated. In this case, the authentication processing is the processing to check whether the user attempting to use the image processing device 200 coincides with the user giving the instruction to execute the job or not. The authentication processing is executed by determining whether authentication information stored in advance for the user giving the instruction to execute the job coincides with the inputted authentication information of the user or not. For example, a password may be used as the authentication information and the authentication processing may be executed by entering the password. Also, identification information stored on an ID card may be used as the authentication information and the authentication processing may be executed by placing the ID card of the user on a reading device. Also, biometric information such as fingerprint information or facial information may be used as the authentication information and the authentication processing may be executed by biometric authentication such as fingerprint authentication or facial authentication. Alternatively, the authentication processing may be executed by a combination of these techniques.

The job accumulation information TbJ may be made to correspond the identification information of the terminal (terminal device 100 or PC 50) transmitting the job signal representing the corresponding job, instead of the user identification information, to the job identification information. When a job is executed, the information about the job that has already been executed may be erased from the job storage unit 232, or a flag indicating "already executed" may be added to the information of the job that has already been executed.

In the example shown in FIG. 5, an instruction to execute a job with job identification information "job A" is given by a user with identification information "user A". The execution of the job with the job identification information "job A" involves authentication processing. An instruction to execute a job with job identification information "job B" is given by a user with identification information "user B". The execution of the job with the job identification information "job B" involves no authentication processing.

The identification information storage unit 234 stores the identification information of a user and the identification information of the device (terminal device 100 or PC 50) owned by the user, establishing the correspondence between these pieces of identification information. The identification information storage unit 234 stores the identification information to be stored, in the form of an identification information table.

Figure 6:
FIG. 6 shows an example of an identification information table stored in an identification information storage unit according to Embodiment 1.

FIG. 6 shows an example of an identification information table TbI stored in the identification information storage unit 234 according to Embodiment 1. As illustrated in FIG. 6, in the identification information table TbI, user identification information and device identification information are corresponded. In this case, the "device identification information" is the identification information of the device owned by the corresponding user. In the example shown in FIG. 6, a user with user identification information "user A" owns a terminal device 100 with device identification information "terminal #1" and a PC 50 with device identification information "PC #1". A user with user identification information "user B" owns a terminal device 100 with device identification information "terminal #2" and a PC 50 with device identification information "PC #2".

The control unit 240 performs processing to perform image processing. The "image processing" includes, for example, print processing and scan processing. The "processing to perform image processing" includes, for example, processing to enable execution of image processing as well as performing processing in such a way as to execute image processing. The "processing to perform image processing" includes, for example, cancellation of a power saving mode, and authentication processing.

The control unit 240 performs the processing to perform image processing, when the position of the terminal device 100 satisfies a predetermined condition. Specifically, the control unit 240 performs the processing to perform image processing, when the position of the terminal device 100 is within a predetermined range in relation to the image processing device 200 and the rate of change in the position of the terminal device 100 is equal to or lower than a threshold, based on the distance information and the direction information. That is, the control unit 240 performs the processing to perform image processing, when the position of the terminal device 100 is within a predetermined range in relation to the image processing device 200 and the rate of change in at least one of the distance from the terminal device 100 and the direction of the terminal device 100 is equal to or lower than a threshold. Details of this will be described later.

The control unit 240 may perform the processing to perform image processing, when at least the distance between the terminal device 100 and the image processing device 200 is equal to or shorter than a threshold and at least the rate of change in the direction of the terminal device 100 is equal to or lower than a threshold. The control unit 240 may also perform the processing to perform image processing, when at least the direction of the terminal device 100 in relation to the image processing device 200 is within a predetermined range and the rate of change in at least one of the distance from the terminal device 100 and the direction of the terminal device 100 is equal to or lower than a threshold. The control unit 240 may also perform the processing to perform image processing, when the state where the rate of change in the position of the terminal device 100 is equal to or lower than a threshold has continued for a predetermined time. That is, the control unit 240 may perform the processing to perform image processing, when the state where the rate of change in at least one of the distance from the terminal device 100 and the direction of the terminal device 100 is equal to or lower than a threshold has continued for a predetermined time. Details of this will be described later.

When the position of the terminal device 100 is within a predetermined range in relation to the image processing device 200 and the rate of change in the position of the terminal device 100 is equal to or lower than a threshold, the control unit 240 may execute the job corresponding to the identification information of the user relating to the terminal device 100. Details of this will be described later. Also, when the job corresponding to the terminal device 100 is a job with authentication processing, the control unit 240 may perform processing as described below. That is, the control unit 240 may display a screen to perform authentication processing, when the position of the terminal device 100 is within a predetermined range in relation to the image processing device 200 and the rate of change in at least one of the distance from the terminal device 100 and the direction of the terminal device 100 is equal to or lower than a threshold. The control unit 240 may execute the job when the authentication processing is successful. Details of this will be described later.

The mode control unit 242 performs processing in such a way as to shift to the power saving mode, when no operation of the image processing device 200 is performed for a predetermined time. The mode control unit 242 cancels the power saving mode of the image processing device 200 in a predetermined case. For example, the mode control unit 242 may cancel the power saving mode of the image processing device 200 when the user touches the operation panel 220. Details of this will be described later. The authentication control unit 244 performs processing in such a way as to execute authentication processing when a job with authentication processing is to be executed. Details of this will be described later. The print control unit 246 performs processing in such a way as to execute print processing. That is, the print control unit 246 performs processing in such a way as to execute a print job. Details of this will be described later.

Figure 7:
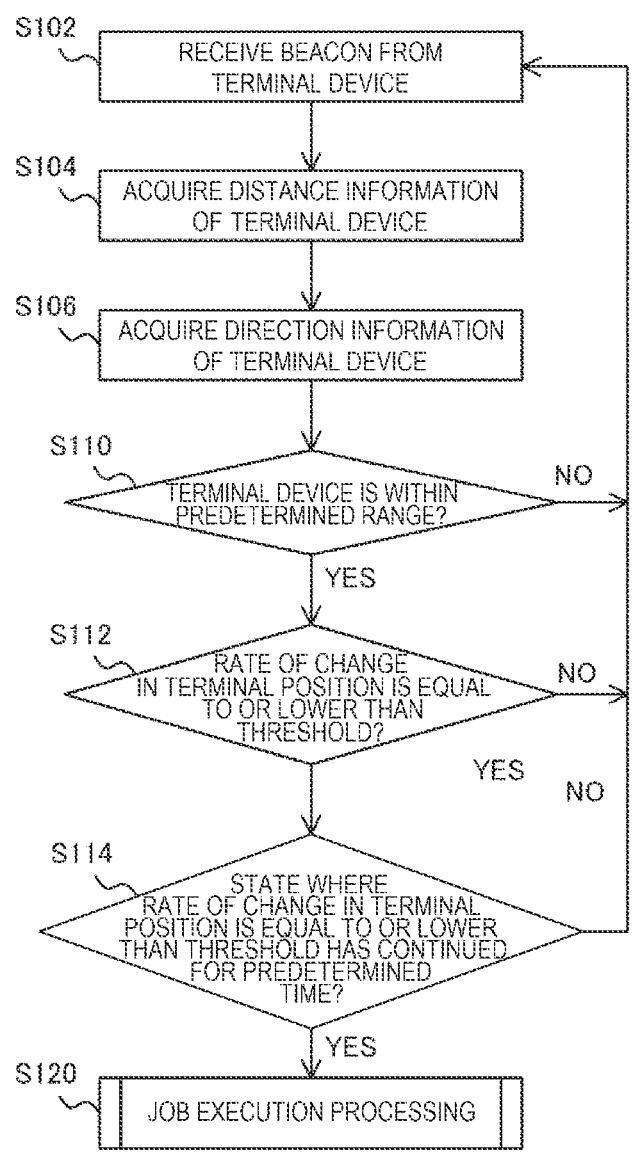
FIG. 7 is a flowchart showing processing executed by the image processing device according to Embodiment 1.
Figure 8:
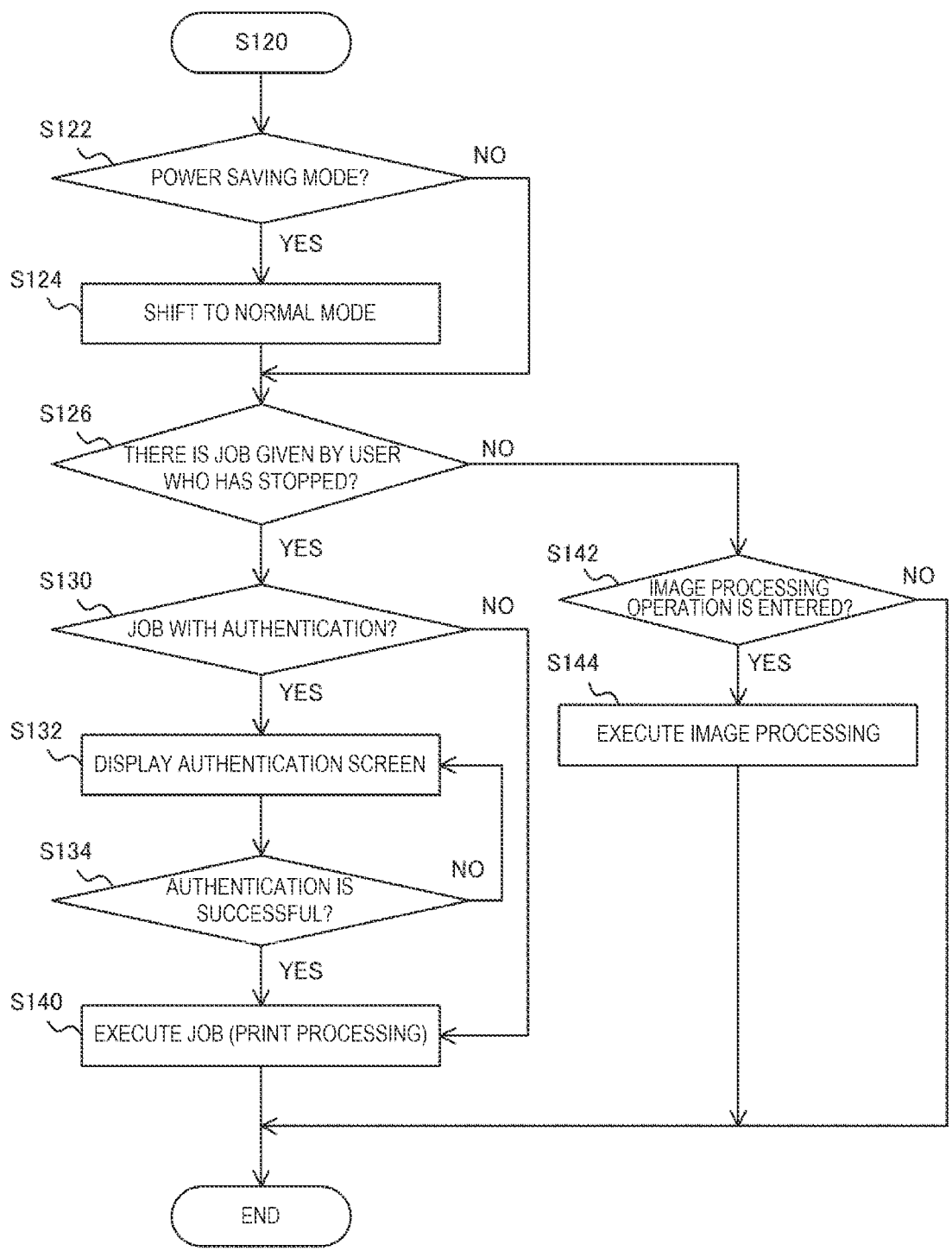
FIG. 8 is a flowchart showing processing executed by the image processing device according to Embodiment 1.

FIGS. 7 and 8 are flowcharts showing processing executed by the image processing device 200 according to Embodiment 1. The flowcharts shown in FIGS. 7 and 8 correspond to a control method executed by the image processing device 200. When the job receiving unit 230 receives a job signal from the terminal device 100 or the PC 50 during steps S102 to S114, described later, the information of the job relating to the received job signal is stored and accumulated in the job storage unit 232.

The image processing device 200 receives a beacon from the terminal device 100 (step S102). Specifically, the second wireless communication unit 208 receives a radio wave of the BLE beacon Bb transmitted from the terminal device 100. The BLE beacon Bb transmitted from the terminal device 100 includes the identification information of the terminal device 100. Therefore, the image processing device 200 receives the identification information of the terminal device 100 in the processing of S102. The terminal device 100 can transmit the beacon at a predetermined time interval. Therefore, the subsequent processing can be executed every time the image processing device 200 receives the beacon from the terminal device 100.

The distance information acquisition unit 222 acquires the distance information of the terminal device 100 (step S104). As described above, the distance information acquisition unit 222 acquires the distance information representing the distance between the terminal device 100 and the image processing device 200, based on the radio wave arriving from the terminal device 100. Specifically, the distance information acquisition unit 222 acquires the distance information of the terminal device 100 by short-range wireless communication such as BLE or Bluetooth.

More specifically, the distance information acquisition unit 222 acquires radio wave intensity information representing the radio wave intensity of the received BLE beacon Bb. The radio wave intensity information can correspond to the received radio wave intensity or the received signal intensity. The distance information acquisition unit 222 estimates the distance between the image processing device 200 and the terminal device 100, using the radio wave intensity information.

That is, as the radio wave intensity of the BLE beacon Bb becomes higher, the distance between the terminal device 100 transmitting this BLE beacon Bb and the image processing device 200 becomes shorter. On the other hand, as the radio wave intensity of the BLE beacon Bb becomes lower, the distance between the terminal device 100 transmitting this BLE beacon Bb and the image processing device 200 becomes longer. For example, in the case of iBeacon (trademark registered), which is a BLE standard, the range to which a beacon signal is transmitted can be set from among three types, that is, "immediate" (proximate), "near" (close), and "far" (distant). For example, "immediate" corresponds to a distance of approximately several centimeters, "near" corresponds to a distance of approximately several meters, and "far" corresponds to a distance of approximately 10 meters. In this way, the distance information acquisition unit 222 acquires the distance information representing the distance between the image processing device 200 and the terminal device 100.

Alternatively, the distance information acquisition unit 222 may compute the distance between the terminal device 100 transmitting the BLE beacon Bb and the image processing device 200, based on the radio wave intensity of the BLE beacon Bb. Generally, the radio wave intensity is known to be in inverse proportion to the square of the distance. Therefore, if the radio wave intensity at a reference distance is known, the distance between the image processing device 200 and the terminal device 100 can be computed, based on the radio wave intensity of the BLE beacon Bb that is actually received. In this case, the BLE beacon Bb is configured to include reference radio wave intensity information. The distance information acquisition unit 222 computes the distance between the image processing device 200 and the terminal device 100, based on the reference radio wave intensity information and the radio wave intensity information. Thus, the distance information acquisition unit 222 acquires the distance information representing the distance between the image processing device 200 and the terminal device 100.

The direction information acquisition unit 224 acquires the direction information of the terminal device 100 (step S106). As described above, the direction information acquisition unit 224 acquires the direction information representing the direction of the terminal device 100 in relation to the image processing device 200, based on the radio wave arriving from the terminal device 100. Specifically, the direction information acquisition unit 224 acquires the direction information of the terminal device 100 by short-range wireless communication such as BLE or Bluetooth.

More specifically, the direction information acquisition unit 224 acquires the direction information representing the direction of the terminal device 100 in relation to the image processing device 200, using a direction detection function defined by the Bluetooth standard from version 5.1 onward. The direction information acquisition unit 224 calculates the angle of reception, that is, the angle of arrival (AoA), of the radio wave in the image processing device 200 with respect to the BLE beacon Bb transmitted from the terminal device 100, by an AoA system in the direction detection function. That is, the image processing device 200 has a plurality of antennas relating to the second wireless communication unit 208. The image processing device 200 receives the radio wave, that is, the BLE beacon Bb, via the plurality of antennas. The direction information acquisition unit 224 of the image processing device 200 calculates the angle of arrival AoA, which is an angle in relation to the direction in which the plurality of antennas are arrayed, based on the distance between the plurality of antennas and the phase difference in the radio wave received by the plurality of antennas. The angle of arrival AoA corresponds to the direction of the terminal device 100 in relation to the image processing device 200.

Alternatively, the direction information acquisition unit 224 may acquire the direction information representing the direction of the terminal device 100 in relation to the image processing device 200, using a BLE beacon transmitted from the image processing device 200. Specifically, the terminal device 100 detects the angle of transmission, that is, the angle of departure AoD, of the radio wave in the image processing device 200 with respect to the BLE beacon transmitted from the image processing device 200, by an AoD system in the direction detection function. That is, the image processing device 200 has a plurality of antennas. The image processing device 200 emits the radio wave, that is, the BLE beacon, from the plurality of antennas. The terminal device 100 calculates the angle of departure AoD, which is an angle in relation to the direction in which the plurality of antennas are arrayed, based on the distance between the plurality of antennas and the phase difference in the radio wave transmitted from the plurality of antennas. It is assumed that information representing the distance between the plurality of antennas in the image processing device 200 and information representing the timing of transmitting the radio wave from the plurality of antennas are given to the terminal device 100 in advance. These pieces of information may be included in the BLE beacon. The terminal device 100 then transmits a radio wave (BLE beacon or the like) representing the angle of departure AoD to the image processing device 200. The angle of departure AoD corresponds to the direction of the terminal device 100 in relation to the image processing device 200. The direction information acquisition unit 224 may thus acquire the direction information representing the direction of the terminal device 100 in relation to the image processing device 200.

In this way, the direction information acquisition unit 224 acquires an angle α corresponding to the direction of the terminal device 100 in relation to the image processing device 200. The angle α corresponds to the angle of the direction of the terminal device 100 in relation to the direction in which the plurality of antennas are arrayed (angle of arrival AoA or angle of departure AoD).

Figure 9:
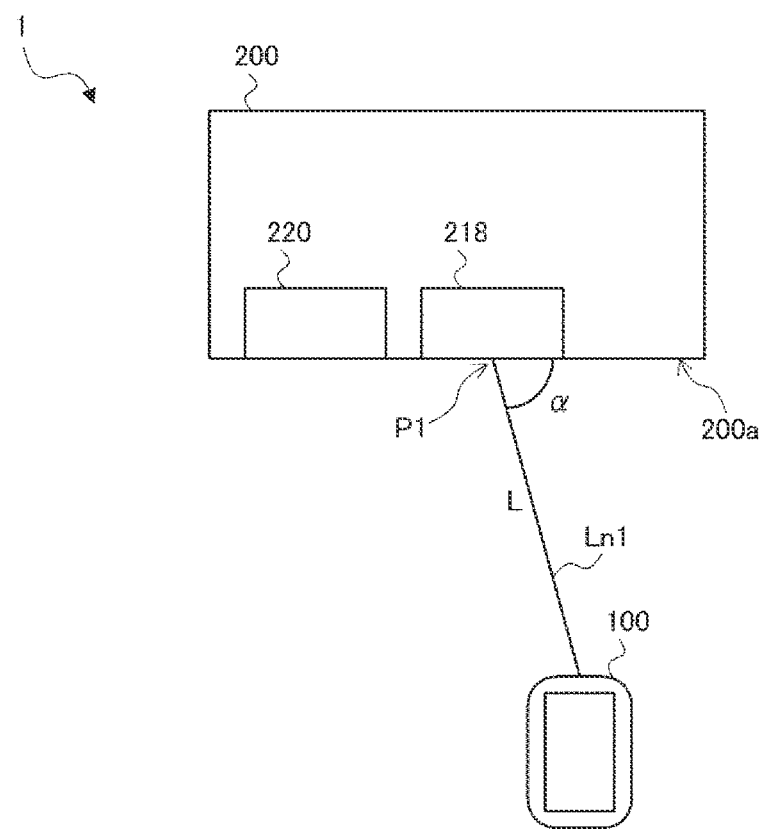
FIG. 9 explains the positional relationship between the image processing device and the terminal device according to Embodiment 1.

FIG. 9 explains the positional relationship between the image processing device 200 and the terminal device 100 according to Embodiment 1. The illustration of the image processing device 200 shown in FIG. 9 is a schematic view of the image processing device 200 as viewed from above. Of the side faces of the image processing device 200, a side face suitable for the user to operate the operation panel 220 of the image processing device 200 is defined as a face 200*a* at the front.

A wireless substrate 218 is provided with an antenna for transmitting and receiving a radio wave such as a BLE beacon and a Wi-Fi beacon. Therefore, the distance information acquired in the processing of S104 may represent the distance between a reference position P1 prescribed by the wireless substrate 218 of the image processing device 200, and the terminal device 100. The direction information acquired in the processing of S106 may represent the direction of the terminal device 100 in relation to the reference position P1 prescribed by the wireless substrate 218 of the image processing device 200.

It is assumed that the wireless substrate 218 and the terminal device 100 are connected together by a line Ln1, as shown in FIG. 9. The line Ln1 connects the reference position P1 on the wireless substrate 218 and a reference position on the terminal device 100. For the sake of explanation, it is assumed that a plurality of antennas on the wireless substrate 218 are arranged in an array parallel to the face 200*a* on the front of the image processing device 200. In this case, the angle α of the line Ln1 to the face 200*a* corresponds to the direction of the terminal device 100 in relation to the wireless substrate 218 of the image processing device 200, that is, the direction information. The length L of the line Ln1 corresponds to the distance between the image processing device 200 (wireless substrate 218) and the terminal device 100. The plurality of antennas on the wireless substrate 218 need not be arranged in an array parallel to the face 200*a*.

Referring back to FIG. 7, the terminal position determination unit 226 determines whether the position of the terminal device 100 is within a predetermined range in relation to the image processing device 200 or not, using the distance information and the direction information of the terminal device 100 (step S110). The "predetermined range" corresponds to an area that is regarded to be in the vicinity of the front of the image processing device 200. Therefore, in the processing of S110, the terminal position determination unit 226 determines whether the position of the terminal device 100 (terminal position) is in the vicinity of the front of the image processing device 200 or not.

The "predetermined range" corresponds to an area including a position where the user can operate the operation panel 220 of the image processing device 200. The "predetermined range" can be prescribed by the direction in relation to the reference position on the image processing device 200. The "predetermined range" can also be prescribed by the distance from the reference position on the image processing device 200. The "predetermined range" can also be prescribed by the direction in relation to the reference position on the image processing device 200 and the distance from the reference position. As described above, the reference position can be determined by the position of the wireless substrate 218 having the plurality of antennas relating to the second wireless communication unit 208.

Figure 10:
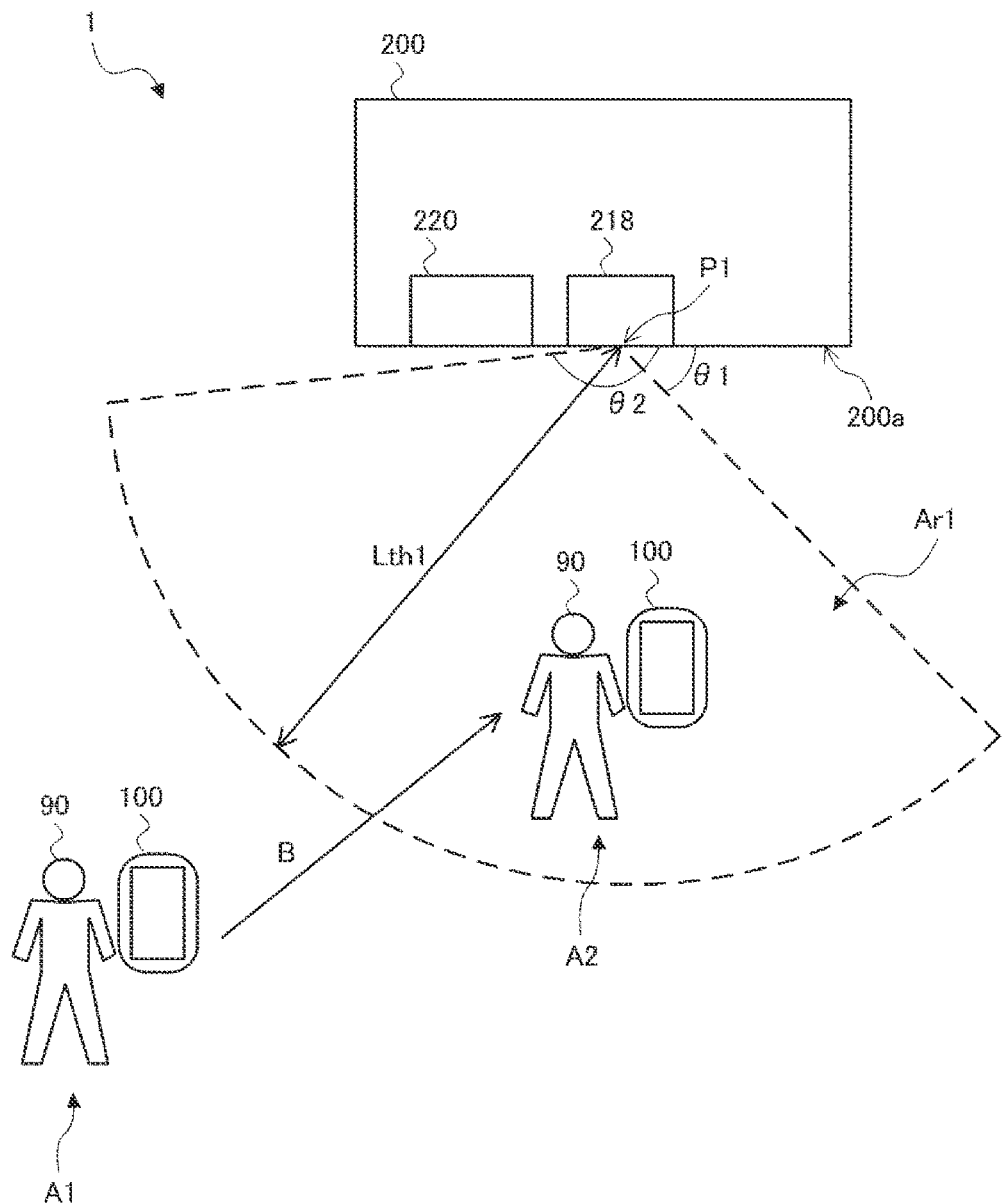
FIG. 10 explains a predetermined range in relation to the image processing device according to Embodiment 1.

FIG. 10 explains the predetermined range in relation to the image processing device 200 according to Embodiment 1. In FIG. 10, a predetermined range Ar1 in relation to the image processing device 200 is shown as an area surrounded by a dashed line. The predetermined range Ar1 is prescribed on the side of the face 200a on the front of the image processing device 200. The predetermined range Ar1 is also prescribed in relation to the reference position P1 corresponding to the wireless substrate 218.

In the example shown in FIG. 10, the predetermined range Ar1 is an area extending to a distance equal to or shorter than a threshold Lth1 from the reference position P1. The predetermined range Ar1 is also an area extending in a direction ranging from an angle θ1 or greater and an angle θ2 or smaller from the face 200a in relation to the reference position P1. That is, the predetermined range Ar1 is an area such that an angle θr corresponding to the direction in relation to the face 200a on the basis of the reference position P1 satisfies θ1≤θr≤θ2. Lth1, θ1, and θ2 can be suitably set in such a way that the "predetermined range" is regarded as an area in the vicinity of the front of the image processing device 200. Also, Lth1, θ1, and θ2 can be suitably set in such a way that the "predetermined range" includes an area where the user can operate the operation panel 220.

In the example shown in FIG. 10, the terminal position determination unit 226 determines whether the distance L represented by the distance information of the terminal device 100 is equal to or shorter than the threshold Lth1 and the angle α represented by the direction information of the terminal device 100 is equal to or greater than the angle θ1 and equal to or smaller than the angle θ2, or not. When the result of this determination is positive, the terminal position determination unit 226 determines that the position of the terminal device 100 is within the predetermined range Ar1. Meanwhile, when the result of the determination is negative, the terminal position determination unit 226 determines that the position of the terminal device 100 is not within the predetermined range Ar1.

When a user 90 holding the terminal device 100 is not located within the predetermined range Ar1, as indicated by an arrow A1 in FIG. 10, the terminal position determination unit 226 determines that the position of the terminal device 100 is not within the predetermined range Ar1. Meanwhile, when the user 90 holding the terminal device 100 moves as indicated by an arrow B into the predetermined range Ar1, as indicated by an arrow A2 in FIG. 10, the terminal position determination unit 226 determines that the position of the terminal device 100 is within the predetermined range Ar1.

The predetermined range Ar1 illustrated in FIG. 10 is prescribed by the direction in relation to the reference position P1 and the distance from the reference position P1. However, the predetermined range Ar1 is not limited to such a configuration. The predetermined range Ar1 may be prescribed by only the distance from the reference position P1. In this case, the terminal position determination unit 226 determines whether the distance L represented by the distance information of the terminal device 100 is equal to or shorter than the threshold Lth1 or not. When the result of this determination is positive, the terminal position determination unit 226 determines that the position of the terminal device 100 is within the predetermined range Ar1. Meanwhile, when the result of the determination is negative, the terminal position determination unit 226 determines that the position of the terminal device 100 is not within the predetermined range Ar1.

Alternatively, the predetermined range Ar1 may be prescribed by only the direction in relation to the reference position P1. In this case, the terminal position determination unit 226 determines whether the angle α represented by the direction information of the terminal device 100 is equal to or greater than the angle θ1 and equal to or smaller than the angle θ2, or not. When the result of this determination is positive, the terminal position determination unit 226 determines that the position of the terminal device 100 is within the predetermined range Ar1. Meanwhile, when the result of the determination is negative, the terminal position determination unit 226 determines that the position of the terminal device 100 is not within the predetermined range Ar1.

Referring back to FIG. 7, when the position of the terminal device 100 is not within the predetermined range (NO in S110), the terminal device 100 is not in the vicinity of the front of the image processing device 200. Therefore, the processing returns to S102. Meanwhile, when the position of the terminal device 100 is within the predetermined range (YES in S110), the terminal position determination unit 226 determines whether the user of the terminal device 100 stops within the predetermined range, that is, in the vicinity of the front of the image processing device 200, or not (S112, S114). In other words, the terminal position determination unit 226 determines whether the terminal device 100 stands still within the predetermined range, that is, in the vicinity of the front of the image processing device 200, or not (S112, S114). Hereinafter, the state where the terminal device 100 is standstill within the predetermined range, that is, in the vicinity of the front of the image processing device 200, is referred to as a "standstill state". That is, that "the terminal device 100 is in the standstill state" corresponds to that the user of the terminal device 100 stops (stays) within the predetermined range, that is, in the vicinity of the front of the image processing device 200. The terminal device 100 in the standstill state may be referred to as a "standstill terminal". The user of the terminal device 100 in the standstill state may be referred to as a "standstill user" or a "user who has stopped" or the like.

The terminal position determination unit 226 determines whether the rate of change in the position of the terminal device 100 is equal to or lower than a threshold that is determined in advance, or not (step S112). That is, the terminal position determination unit 226 determines whether the terminal device 100 has stopped moving or is about to stop moving within the predetermined range or not. In other words, the terminal position determination unit 226 determines whether the user holding the terminal device 100 has stayed or is about to stay within the predetermined range or not. That is, the terminal position determination unit 226 determines whether the terminal device 100 and the user holding the terminal device 100 have stayed or are about to stay in the vicinity of the front of the image processing device 200 or not.

Specifically, the terminal position determination unit 226 determines whether the rate of change in at least one of the distance from the terminal device 100 and the direction of the terminal device 100 is equal to or lower than a threshold that is determined in advance, or not, using the distance information and the direction information of the terminal device 100. The rate of change in the distance is the amount of change in the distance L per unit time. The rate of change in the direction is the amount of change in the direction (angle α) per unit time. The threshold of the rate of change can be suitably set in such a way that the terminal device 100 and the user are regarded to have stopped moving or be about to stop moving, when the rate of change is equal to or lower than the threshold. That is, the threshold of the rate of change can be suitably set in such a way that the user is regarded to have stopped or be about to stop when the rate of change is equal to or lower than the threshold.

In the processing of S112, the terminal position determination unit 226 may determine whether at least the rate of change in the direction of the terminal device 100 is equal to or lower than a threshold that is determined in advance, or not. In this case, when the terminal position determination unit 226 determines in the processing of S110 at least whether the distance between the terminal device 100 and the image processing device 200 is equal to or shorter than the threshold, the terminal position determination unit 226 may determine at least whether the rate of change in the direction of the terminal device 100 is equal to or lower than the threshold.

Also, in the processing of S112, the terminal position determination unit 226 may determine whether the rate of change in the distance from the terminal device 100 is equal to or lower than a threshold that is determined in advance, or not. In this case, when the terminal position determination unit 226 determines in the processing of S110 at least whether the direction of the terminal device 100 in relation to the image processing device 200 is within the predetermined range or not, the terminal position determination unit 226 may determine whether the rate of change in the distance from the terminal device 100 is equal to or lower than the threshold. That is, when the terminal position determination unit 226 determines in the processing of S110 at least whether the direction of the terminal device 100 in relation to the image processing device 200 is within the predetermined range or not, the terminal position determination unit 226 may determine whether the rate of change in at least one of the distance from the terminal device 100 and the direction of the terminal device 100 is equal to or lower than the threshold.

When the rate of change in the position of the terminal device 100 is not equal to or lower than the threshold (NO in S112), it is regarded that the terminal device 100 and the user have not stopped moving and are not about to stop moving, either. In this case, it is regarded that the terminal device 100 is not in the standstill state. Therefore, in this case, it can be regarded that the user of the terminal device 100 has simply passed by the predetermined range, that is, the vicinity of the front of the image processing device 200. In other words, in this case, it can be regarded that the user of the terminal device 100 does not stop within the predetermined range, that is, in the vicinity of the front of the image processing device 200. Therefore, in this case, it can be regarded that the user has no intention to use the image processing device 200. Therefore, in this case, the image processing device 200 does not perform job execution processing (S120), described later, and the processing returns to S102.

Meanwhile, when the rate of change in the position of the terminal device 100 is equal to or lower than the threshold (YES in S112), it is regarded that the terminal device 100 and the user have stopped moving or are about to stop moving. In this case, it is probable that the terminal device 100 may be in the standstill state. In other words, it is probable that the terminal device 100 may stand still within the predetermined range, that is, in the vicinity of the front of the image processing device 200. In this case, it is probable that the user may stop within the predetermined range, that is, in the vicinity of the front of the image processing device 200, in order to use the image processing device 200. In this case, the terminal position determination unit 226 determines whether the state where the rate of change in the position of the terminal device 100 is equal to or lower than the threshold has continued for a predetermined time that is determined in advance, or not (step S114). That is, the terminal position determination unit 226 determines whether the state where the rate of change in at least one of the distance from the terminal device 100 and the direction of the terminal device 100 is equal to or lower than the threshold has continued for the predetermined time or not.

The "predetermined time" corresponds to, for example, the time for which the user stops in the vicinity of the front of the image processing device 200 (corresponding to the "predetermined range Ar1") in order to use the image processing device 200. In other words, if the user stops in the vicinity of the front of the image processing device 200 for the predetermined time or longer, it can be regarded that the user intends to use the image processing device 200. To paraphrase this further, if the position of the terminal device 100 is within the predetermined range Ar1 and the movement of the terminal device 100 has been standstill (stopped) continuously for the predetermined time or longer, it can be regarded that the user of the terminal device 100 intends to use the image processing device 200. Therefore, the "predetermined time" can be suitably set in such a way that it can be regarded that the user of the terminal device 100 intends to use the image processing device 200, when the state where the rate of change in the position of the terminal device 100 is equal to or lower than the threshold has continued for the predetermined time.

When the state where the rate of change in the position of the terminal device 100 is equal to or lower than the threshold has not continued for the predetermined time (NO in S114), the processing returns to S102. That is, when the state where the rate of change in at least one of the distance from the terminal device 100 and the direction of the terminal device 100 is equal to or lower than the threshold has not continued for the predetermined time, the processing returns to S102. That is, in such a case, it is regarded that the state where the movement of the terminal device 100 and the user is standstill has not continued for the predetermined time. In this case, it can be regarded that the user of the terminal device 100 has simply stopped temporarily or has slowed down the speed of movement while passing by the predetermined range, that is, the vicinity of the front of the image processing device 200. Therefore, in this case, it can be regarded that the user has no intention to use the image processing device 200. In this case, the job execution processing (S120), described later, is not executed, and the processing returns to S102.

Meanwhile, when the state where the rate of change in the position of the terminal device 100 is equal to or lower than the threshold has continued for the predetermined time (YES in S114), the control unit 240 performs the job execution processing (step S120). That is, when the state where the rate of change in at least one of the distance from the terminal device 100 and the direction of the terminal device 100 is equal to or lower than the threshold has continued for the predetermined time, the control unit 240 performs the job execution processing. That is, in such a case, it is regarded that the state where the movement of the terminal device 100 and the user is standstill has continued for the predetermined time. In this case, the terminal device 100 can be in the standstill state. In other words, the user of the terminal device 100 can be a user who has stopped (standstill user). In this case, it is highly probable that the user of the terminal device 100 may stop within the predetermined range, that is, in the vicinity of the front of the image processing device 200, in order to use the image processing device 200. Therefore, in this case, it can be regarded that the user intends to use the image processing device 200. In this case, the control unit 240 performs job execution processing.

FIG. 8 shows the job execution processing (S120) executed by the control unit 240 according to Embodiment 1. The mode control unit 242 of the control unit 240 determines whether the image processing device 200 is in the power saving mode or not (step S122). The "power saving mode" is a mode for restraining the power consumption of the image processing device 200. In the power saving mode, for example, the display on the operation panel 220 may be deleted. The power saving mode may also be implemented in the form of switching off the backlight of the operation panel 220. In the power saving mode, for example, electric power may not be supplied to the printing unit 210. In the power saving mode, the control unit 240 and the printing unit 210 of the image processing device 200 may be turned into a standby state and thus turned into a lower power supply state.

When the image processing device 200 is in the power saving mode (YES in S122), the mode control unit 242 cancels the power saving mode of the image processing device 200 and shifts to the normal mode (step S124). In the normal mode, electric power can be supplied to each device in the image processing device 200. Meanwhile, when the image processing device 200 is not in the power saving mode (NO in S122), the mode control unit 242 skips the processing of S124. Cancelling the power saving mode enables the user to immediately perform an operation when operating the operation panel 220. Also, cancelling the power saving mode enables the image processing device 200 to immediately execute a job of the user.

The control unit 240 determines whether there is a job given by a user who has stopped or not (step S126). Specifically, the control unit 240 determines whether there is a job relating to the user of the terminal device 100 in the standstill state or not, referring to the job accumulation information TbJ stored in the job storage unit 232 and the identification information table TbI stored in the identification information storage unit 234. More specifically, the control unit 240 determines whether a job relating to the identification information of the user corresponding to the identification information of the terminal device 100 in the standstill state is accumulated or not.

When there is a job given by a user who has stopped (YES in S126), the control unit 240 determines whether the job is a job with authentication processing or not (step S130). Specifically, the control unit 240 determines whether authentication processing is to be performed or not, referring to the job accumulation information TbJ. When the job is not a job with authentication processing (NO in S130), the print control unit 246 execute the processing of S140, described later.

Meanwhile, when the job is a job with authentication processing (YES in S130), the authentication control unit 244 performs control in such a way that an authentication screen is displayed (step S132). Specifically, the authentication control unit 244 performs control in such a way that the operation panel 220 displays the authentication screen. The authentication screen is a screen for the user to perform authentication. When the authentication processing is to be performed by entering a password, the authentication screen may display a message prompting the user to enter the password. When the authentication processing is to be performed by reading an ID card, the authentication screen may display a message prompting the user to place the ID card on the reading device. When the authentication processing is to be performed by fingerprint authentication, the authentication screen may display a message prompting the user to move a finger toward a fingerprint reading device.

The authentication control unit 244 determines whether the authentication is successful or not (step S134). Specifically, the authentication control unit 244 determines whether authentication information stored in advance for the user giving the instruction to execute the job coincides with the inputted authentication information of the user or not. When the authentication information stored in advance for the user giving the instruction to execute the job coincides with the inputted authentication information of the user, the authentication control unit 244 determines that the authentication is successful.

When the authentication is successful (YES in step S134), the print control unit 246 executes the job (step S140). That is, the print control unit 246 executes print processing for the job. Specifically, the print control unit 246 controls the printing unit 210 in such a way that print data relating to the job to be executed is formed on a print medium.

Meanwhile, when there is no job given by a user who has stopped in the processing of S126 (NO in S126), the control unit 240 determines whether an operation for image processing is entered or not (step S142). Specifically, the control unit 240 determines whether an operation for image processing such as copying or scanning is entered to the operation panel 220. When an operation for image processing is entered (YES in S142), the control unit 240 executes image processing corresponding to the content of the operation (step S144). Meanwhile, when an operation for image processing is not entered (NO in S142), the processing ends.

As described above, the image processing device 200 according to Embodiment 1 is configured to perform processing to perform image processing, when the position of the terminal device 100 is within a predetermined range in relation to the image processing device 200 and the rate of change in the position of the terminal device 100 is equal to or lower than a threshold. That is, the control unit 240 performs processing to perform image processing, when the position of the terminal device 100 is within a predetermined range in relation to the image processing device 200 and the rate of change in at least one of the distance from the terminal device 100 and the direction of the terminal device 100 is equal to or lower than a threshold. According to such a configuration, processing to perform image processing can be executed when the user stops within a predetermined range in relation to the image processing device 200. Therefore, when the user approaches the image processing device 200, image processing can be performed swiftly. Meanwhile, when the user simply passes by near the image processing device 200, image processing is prevented from being executed by mistake. Thus, the convenience for the user is improved.

The control unit 240 according to Embodiment 1 may perform processing to perform image processing, when at least the distance between the terminal device 100 and the image processing device 200 is equal to or shorter than a threshold and at least the rate of change in the direction of the terminal device 100 is equal to or lower than a threshold. The control unit 240 may also perform processing to perform image processing, when at least the direction of the terminal device 100 in relation to the image processing device 200 is within a predetermined range and the rate of change in at least one of the distance from the terminal device 100 and the direction of the terminal device 100 is equal to or lower than a threshold. According to such a configuration, the control unit 240 performs processing to perform image processing when at least the direction of the terminal device 100 in relation to the image processing device 200 satisfies a predetermined condition. Thus, whether the user stops within a predetermined range in relation to the image processing device 200 or not can be determined more accurately, based on the direction of the terminal device 100 in relation to the image processing device 200. Therefore, when the user stops within the predetermined range in relation to the image processing device 200, processing to perform image processing can be executed more securely. Thus, when the user approaches the image processing device 200, image processing can be performed more swiftly. Meanwhile, when the user simply passes by near the image processing device 200, image processing is prevented more securely from being executed by mistake. Thus, the convenience for the user is improved further.

The control unit 240 according to Embodiment 1 may also perform processing to perform image processing, when the state where the rate of change in the position of the terminal device 100 is equal to or lower than a threshold has continued for a predetermined time. According to such a configuration, whether the user stops within a predetermined range in relation to the image processing device 200 or not can be determined more accurately. That is, when the state where the rate of change in the position of the terminal device 100 is equal to or lower than a threshold has continued for a predetermined time, it is highly probable that the user may stop in the vicinity of the image processing device 200 with an intention to use the image processing device 200. Therefore, processing to perform image processing can be executed more securely when the user stops within a predetermined range in relation to the image processing device 200. Thus, when the user approaches the image processing device 200, image processing can be performed more swiftly. Meanwhile, when the user simply passes by near the image processing device 200, image processing is prevented more securely from being executed by mistake. Thus, the convenience for the user is improved further.

The control unit 240 according to Embodiment 1 may also execute a job corresponding to the identification information of the user relating to the terminal device 100, when the position of the terminal device 100 is within a predetermined range in relation to the image processing device 200 and the rate of change in the position of the terminal device 100 is equal to or lower than a threshold. According to such a configuration, a job given by a user stopping within a predetermined range in relation to the image processing device 200 can be executed swiftly. Therefore, a job given by a user who approaches the image processing device 200 and wishes to execute the job can be executed more securely. Meanwhile, the execution of a job given by a user other than the user who stops within the predetermined range in relation to the image processing device 200 can be prevented. Therefore, the execution of the job given by the user can be prevented when another user is located in the vicinity of the image processing device 200. Thus, the security of the content of the job such as print data can be improved. The convenience for the user is thus improved further.

In Embodiment 1, when the job corresponding to the terminal device 100 is a job with authentication processing, the control unit 240 may perform authentication processing. That is, the control unit 240 may display a screen for performing authentication processing, when the position of the terminal device 100 is within a predetermined range in relation to the image processing device 200 and the rate of change in the position of the terminal device 100 is equal to or lower than a threshold. The control unit 240 may execute the job when the authentication processing is successful. According to such a configuration, when a user giving a job to be executed coincides with a user located in the vicinity of the image processing device 200, the job can be executed. Thus, the security of the content of the job can be improved. The convenience for the user is thus improved further.

Embodiment 2

Embodiment 2 will now be described. In Embodiment 2, processing in the case where a plurality of terminal devices 100 are in the standstill state within a predetermined range, that is, in the vicinity of the front of the image processing device 200, is described. That is, in Embodiment 2, there can be a plurality of users who have stopped. The configurations of the image processing system 1, the terminal device 100, and the image processing device 200 are substantially similar to those in Embodiment 1 and therefore will not be described further.

The image processing device 200 according to Embodiment 2 is communicatively connected to a plurality of terminal devices 100. In the flowchart shown in FIG. 7, the image processing device 200 performs the processing of S102 to S114 for each of the plurality of terminal devices 100. Therefore, in Embodiment 2, the distance information acquisition unit 222 acquires the distance information about each of the plurality of terminal devices 100. The direction information acquisition unit 224 acquires the direction information about each of the plurality of terminal devices 100. These matters similarly apply to Embodiment 3 and Embodiment 4, described later.

Figure 11:
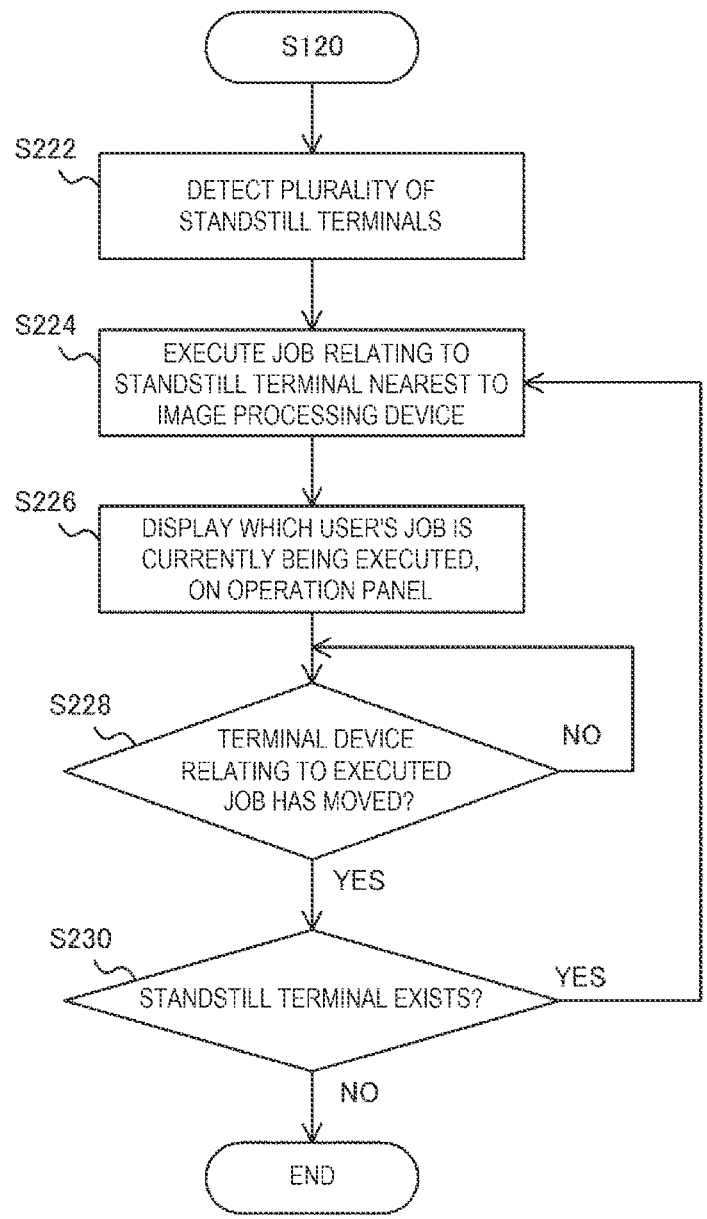
FIG. 11 is a flowchart showing job execution processing executed by a control unit according to Embodiment 2.

FIG. 11 is a flowchart showing the job execution processing executed by the control unit 240 according to Embodiment 2. The control unit 240 detects a plurality of standstill terminals (step S222). That is, the control unit 240 detects that a plurality of terminal devices 100 are in the standstill state within a predetermined range. In other words, the control unit 240 detects that there are a plurality of users who have stopped. Specifically, the control unit 240 detects that a plurality of terminal devices 100 exist for which the results of the determination in S110 to S114 are positive. In other words, the control unit 240 determines that a plurality of terminal devices 100 are within a predetermined range and that the rate of change in the position of each of the plurality of terminal devices 100 is equal to or lower than a threshold. The control unit 240 also determines that a plurality of terminal devices 100 are located within a predetermined range and that the state where the rate of change in the position of each of these terminal devices 100 is equal to or lower than a threshold has continued for a predetermined time.

The control unit 240 executes the job relating to the standstill terminal nearest to the image processing device 200 (step S224). That is, the control unit 240 executes the job relating to the terminal device 100 nearest to the image processing device 200, when the positions of a plurality of terminal devices 100 are within a predetermined range and the rate of change in the position of each of the plurality of terminal devices is equal to or lower than a threshold that is determined in advance. Specifically, the control unit 240 compares the radio wave intensities of BLE beacons arriving from the plurality of standstill terminals. The control unit 240 then determines the standstill terminal relating to the BLE beacon with the highest radio wave intensity, as the standstill terminal nearest to the image processing device 200. The control unit 240 executes the job relating to the user of this standstill terminal. When the job is a print job, the control unit 240 (print control unit 246) performs print processing for this job. At this point, the control unit 240 may perform the processing of S122 to S134.

The control unit 240 causes the operation panel 220 to display a message showing which user's job is currently being executed (step S226). For example, when a user A is the nearest to the image processing device 200, of the plurality of users who have stopped, the control unit 240 may cause the operation panel 220 to display a message such as "User A's job is currently being executed".

The control unit 240 determines whether the terminal device 100 relating to the executed job has moved or not (step S228). That is, the control unit 240 determines whether the terminal device 100 relating to the executed job is no longer in the standstill state, or not. Based on the distance information and the direction information of the terminal device 100 relating to the executed job, the control unit 240 may determine whether the terminal device 100 has moved out of the predetermined range or not. In this case, the control unit 240 may determine that the terminal device 100 has moved, when the terminal device 100 moves out of the predetermined range. Also, based on the distance information and the direction information of the terminal device 100 relating to the executed job, the control unit 240 may determine whether the rate of change in the position of that terminal device 100 exceeds a threshold or not. In this case, the control unit 240 may determine that the terminal device 100 has moved, when the rate of change in the position of the terminal device 100 exceeds the threshold.

When it is not determined that the terminal device 100 relating to the executed job has moved (NO in S228), the processing of S228 is repeated. Meanwhile, when it is determined that the terminal device 100 relating to the executed job has moved (YES in S228), it is highly probable that the user relating to the executed job may have left the vicinity of the image processing device 200 because the job has already been executed. Therefore, the control unit 240 executes the job relating to the standstill terminal that is the next nearest to the image processing device 200. That is, the control unit 240 determines whether another standstill terminal exists or not (step S230). When another standstill terminal exists (YES in S230), the processing returns to S224. Therefore, the job relating to the standstill terminal nearest to the image processing device 200, of the still remaining standstill terminals, is executed (S224). Meanwhile, when no other standstill terminal exists (NO in S230), the processing ends.

As described above, the control unit 240 according to Embodiment 2 executes the job relating to the terminal device 100 nearest to the image processing device 200, when a plurality of terminal devices 100 are within a predetermined range and the rate of change in the position of each of the plurality of terminal devices 100 is equal to or lower than a threshold. According to such a configuration, when there are a plurality of users who have stopped, the job given by the user nearest to the image processing device 200 is executed. Therefore, the execution of a job given by a user other than the user nearest to the image processing device 200 can be restrained. That is, if a job given by a user other than the user nearest to the image processing device 200 is executed, there is a risk that the content of the job given by another user may become known to the user nearest to the image processing device 200. To cope with this, the configuration as described above can improve the security of the content of a job when there are a plurality of users who have stopped. Thus, the convenience for the user is improved further.

Embodiment 3

Embodiment 3 will now be described. In Embodiment 3, processing in the case where a plurality of terminal devices 100 are in the standstill state within a predetermined range, that is, in the vicinity of the front of the image processing device 200, is described. That is, in Embodiment 3, as in Embodiment 2, there can be a plurality of users who have stopped. The processing in the case where a plurality of terminal devices 100 are in the standstill state in Embodiment 3 is different from the processing in Embodiment 2. The configurations of the image processing system 1, the terminal device 100, and the image processing device 200 are substantially similar to those in Embodiment 1 and therefore will not be described further.

Figure 12:
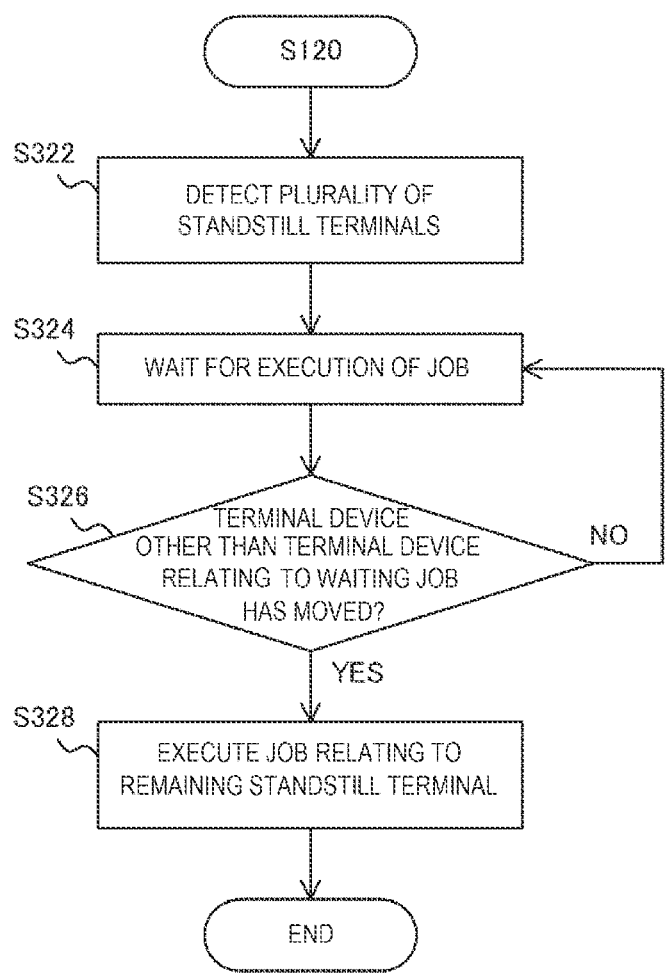
FIG. 12 is a flowchart showing job execution processing executed by a control unit according to Embodiment 3.

FIG. 12 is a flowchart showing the job execution processing executed by the control unit 240 according to Embodiment 3. The control unit 240 detects a plurality of standstill terminals (step S322), as in the processing of S222. In this case, the control unit 240 waits for the execution of a job (step S324). Therefore, in the state where there are a plurality of standstill terminals, that is, a plurality of users who have stopped, the control unit 240 does not execute a job even if the job is accumulated. That is, the control unit 240 waits for the execution of a job, when the positions of a plurality of terminal devices 100 are within a predetermined range and the rate of change in the position of each of the plurality of terminal devices 100 is equal to or lower than a threshold that is determined in advance.

The control unit 240 determines whether the terminal device 100 other than the terminal device 100 relating to the waiting job has moved or not (step S326). That is, the control unit 240 determines whether the terminal device 100 other than the terminal device 100 relating to the waiting job is no longer in the standstill state, or not. In other words, the control unit 240 determines whether the position of only the terminal device 100 relating to the job waiting to be executed is now within the predetermined range or the rate of change in the position of only this terminal device 100 is now equal to or lower than the threshold, or not. To paraphrase this further, the control unit 240 determines whether only the terminal device 100 relating to the job waiting to be executed is now in the standstill state or not.

The control unit 240 may determine whether a terminal device 100 other than the terminal device 100 relating to the waiting job has moved out of the predetermined range or not, based on the distance information and the direction information of the terminal device 100 other than the terminal device 100 relating to the waiting job. In this case, the control unit 240 may determine that the terminal device 100 other than the terminal device 100 relating to the waiting job has moved, when the terminal device 100 other than the terminal device 100 relating to the waiting job moves out of the predetermined range. Also, the control unit 240 may determine whether the rate of change in the position of the terminal device 100 other than the terminal device 100 relating to the waiting job exceeds the threshold or not, based on the distance information and the direction information of the terminal device 100 other than the terminal device 100 relating to the waiting job. In this case, the control unit 240 may determine that the terminal device 100 other than the terminal device 100 relating to the waiting job has moved, when the rate of change in the position of the terminal device 100 other than the terminal device 100 relating to the waiting job exceeds the threshold.

When it is not determined that the terminal device 100 other than the terminal device 100 relating to the waiting job has moved (NO in S326), the processing returns to S324 and the control unit 240 continues to wait for the execution of the job. Meanwhile, when it is determined that the terminal device 100 other than the terminal device 100 relating to the waiting job has moved (YES in S326), the control unit 240 executes the job relating to the remaining standstill terminal (step S328). In other words, when only the terminal device 100 relating to the job waiting to be executed is in the standstill state, the control unit 240 executes the job relating to this terminal device 100. That is, when the position of only the terminal device 100 relating to the job waiting to be executed is within the predetermined range, the control unit 240 executes the job. Alternatively, when only the rate of change in at least one of the distance from the terminal device 100 relating to the job waiting to be executed and the direction of this terminal device is equal to or lower than the threshold, the control unit 240 executes the job.

As described above, the control unit 240 according to Embodiment 3 waits for the execution of a job, when the positions of a plurality of terminal devices 100 are within a predetermined range and the rate of change in the position of each of the plurality of terminal devices 100 is equal to or lower than a threshold. When the position of only the terminal device 100 relating to the job waiting to be executed is within the predetermined range or the rate of change in the position of only this terminal device 100 is equal to or lower than the threshold, the control unit 240 executes the job. According to such a configuration, when there are a plurality of users who have stopped, the execution of a job is waited for. When a user other than the user relating to the waiting job moves and only the user relating to the waiting job is a user who has stopped, the job is executed. Thus, the content of the job can be prevented from becoming known to the user other than the user relating to the job. Thus, the security of the content of a job in the case where there are a plurality of users who have stopped can be improved further than in Embodiment 2. The convenience for the user is thus improved further.

Embodiment 4

Embodiment 4 will now be described. In Embodiment 4, processing in the case where a plurality of terminal devices 100 are in the standstill state within a predetermined range, that is, in the vicinity of the front of the image processing device 200, is described. That is, in Embodiment 4, as in Embodiment 2 and Embodiment 3, there can be a plurality of users who have stopped. The processing in the case where a plurality of terminal devices 100 are in the standstill state in Embodiment 4 is different from the processing in Embodiment 2 and Embodiment 3. The configurations of the image processing system 1, the terminal device 100, and the image processing device 200 are substantially similar to those in Embodiment 1 and therefore will not be described further. In Embodiment 4, whether it is with or without authentication processing is designated for a job, as described in Embodiment 1.

Figure 13:
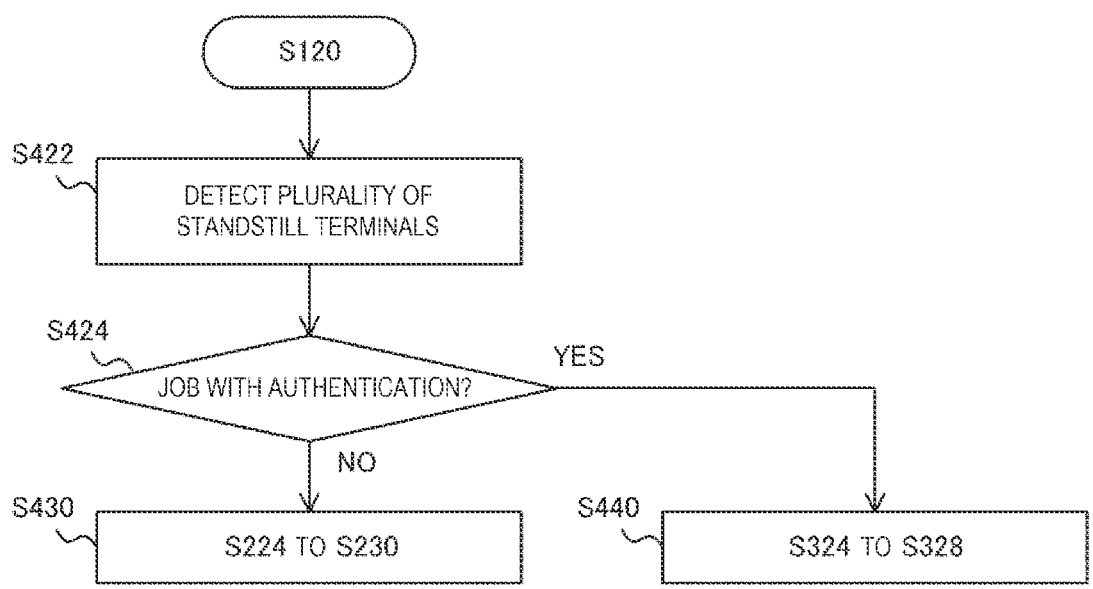
FIG. 13 is a flowchart showing job execution processing executed by a control unit according to Embodiment 4.

FIG. 13 is a flowchart showing the job execution processing executed by the control unit 240 according to Embodiment 4. The control unit 240 detects a plurality of standstill terminals (step S422), as in the processing of S222. In this case, the control unit 240 determines whether the job to be executed is a job with authentication processing or not (step S424), as in the processing of S130.

When the job to be executed is a job without authentication processing (NO in S424), the control unit 240 performs processing substantially similar to the processing of S224 to S230 in Embodiment 2 (step S430). That is, the control unit 240 executes the job corresponding to the terminal device 100 that is the terminal device nearest to the image processing device 200.

Meanwhile, when the job to be executed is a job with authentication processing (YES in S424), the control unit 240 performs processing substantially similar to the processing of S324 to S328 in Embodiment 3 (step S440). That is, the control unit 240 waits for the execution of the job. In this case, the control unit 240 may not cause the operation panel 220 to display an authentication screen. The control unit 240 executes the job when the terminal device 100 other than the terminal device 100 relating to the waiting job with authentication processing moves. In other words, when only the terminal device 100 relating to the job waiting to be executed is in the standstill state, the control unit 240 executes the job with authentication processing relating to this terminal device 100. That is, when the position of only the terminal device 100 relating to the job waiting to be executed is within the predetermined range, the control unit 240 executes the job. Alternatively, when only the rate of change in at least one of the distance from the terminal device 100 relating to the job waiting to be executed and the direction of this terminal device is equal to or lower than the threshold, the control unit 240 executes the job. In this case, the control unit 240 performs the processing of S132 and S134.

As described above, the control unit 240 according to Embodiment 4 executes a job according to whether the job to be executed is a job with authentication processing or not, when a plurality of terminal devices 100 are within a predetermined range and the rate of change in the position of each of the plurality of terminal devices 100 is equal to or lower than a threshold. That is, when the job to be executed is a job without authentication processing, the control unit 240 executes the job relating to the terminal device 100 nearest to the image processing device 200. Meanwhile, when the job to be executed is a job with authentication processing, the control unit 240 waits for the execution of the job. When the position of only the terminal device 100 relating to the job waiting to be executed is within the predetermined range or the rate of change in the position of only this terminal device 100 is equal to or lower than the threshold, the control unit 240 executes the job. According to such a configuration, when there are a plurality of users who have stopped, the execution of a job can be controlled according to whether the job to be executed is a job with authentication processing or not, that is, the required security level. For a job without authentication processing, the required security level is not so high as for a job with authentication processing. Therefore, executing the job given by the user nearest to the image processing device 200 enables the job to be executed more swiftly than when including the process of authentication processing, while securing a certain level of security. Meanwhile, for a job with authentication processing, the required security level is high. Therefore, executing the job after a user who has stopped but does not correspond to the job has moved, can achieve a high level of security. Thus, the convenience for the user is improved further.

Modification Examples

The present disclosure is not limited to the above embodiments and can be suitably changed without departing from the spirit and scope of the present disclosure. For example, the orders of the processing steps in the foregoing flowcharts can be suitably changed. Also, one or more of the processing steps in the foregoing flowcharts can be omitted. For example, in the flowchart of FIG. 7, the order of the processing of S104 and the processing of S106 may be reversed or the processing of S104 and the processing of S106 may be executed in parallel. In the flowchart of FIG. 7, the processing of S114 may be omitted. That is, the terminal position determination unit 226 may determine whether a standstill terminal and a user who has stopped exist or not, only by the processing of S112. However, by executing the processing of S114, it can be determined more securely whether a standstill terminal and a user who has stopped exist or not.

In the foregoing Embodiments 2 to 4, when there are a plurality of users who have stopped, that is, when there are a plurality of standstill terminals, the execution of a job is limited. However, such a configuration is not limiting. The control unit 240 may execute processing as shown in FIG. 8 even when there are a plurality of standstill terminals. In this case, it is probable that a job given by a user who is different from the user nearest to the image processing device 200, that is, nearest to the operation panel 220, may be executed.

Figure 14:
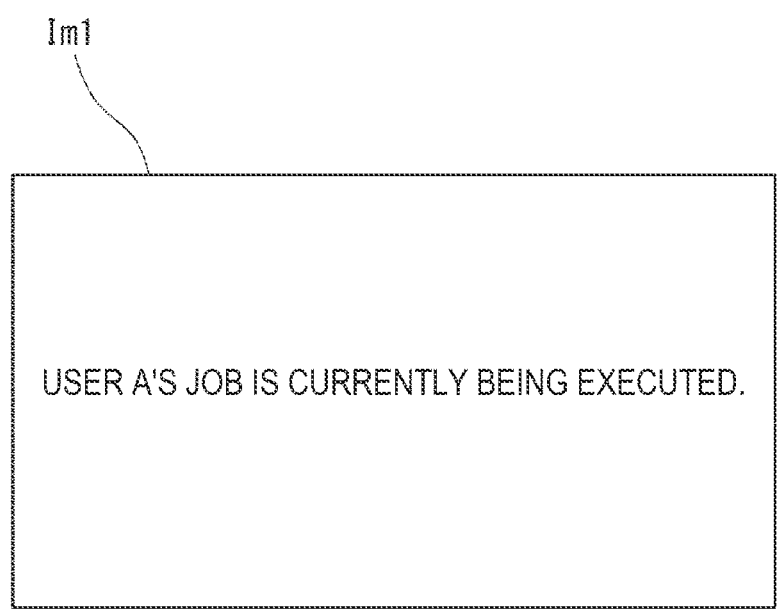
FIG. 14 shows an example of a screen displayed on an operation panel when a plurality of standstill terminals exist in a modification example.
Figure 15:
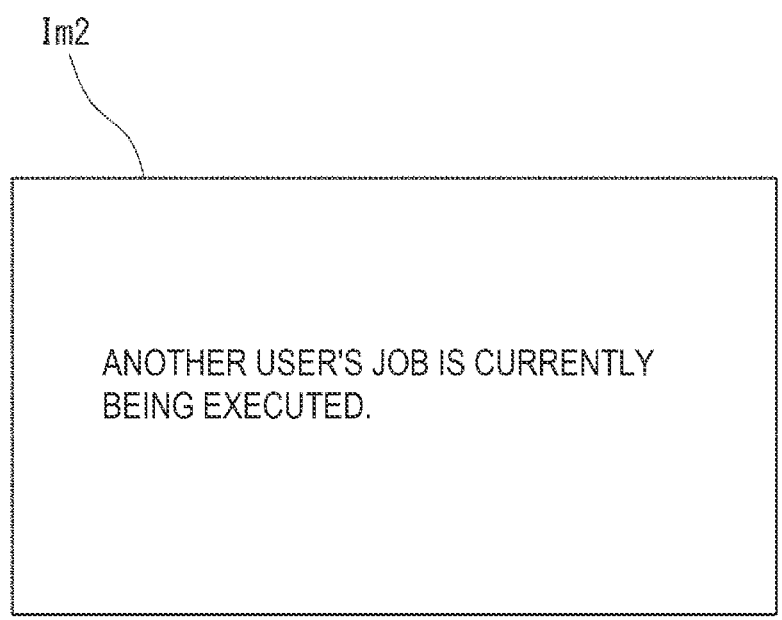
FIG. 15 shows an example of a screen displayed on an operation panel when a plurality of standstill terminals exist in a modification example.

FIGS. 14 and 15 show an example of a screen displayed on the operation panel 220 when there are a plurality of standstill terminals in a modification example. FIG. 14 shows an example of a screen Im1 displayed on the operation panel 220 when a user A is in front of the operation panel 220 during the execution of the user A's job. In the example shown in FIG. 14, "User A's job is currently being executed" is displayed on the operation panel 220. In this case, the user A viewing the operation panel 220 can grasp that the user A's own job is currently being executed.

FIG. 15 shows an example of a screen Im2 displayed on the operation panel 220 when a user B is in front of the operation panel 220 during the execution of the user A's job. In the example shown in FIG. 15, "Another user's job is currently being executed" is displayed on the operation panel 220. In this case, the user B viewing the operation panel 220 can grasp that a job that is not the user B's own job is currently being executed. However, if such a screen is simply displayed, it is probable that the content of another user's job may be printed on a print medium. In this respect, Embodiments 2 to 4 can achieve the security of the content of the job.

In the above examples, the program includes a command set (or software code) for causing a computer to execute one or more of the functions described in the embodiments, when read by the computer. The program may be stored in a non-transitory computer-readable medium or a substantive storage medium. The computer-readable medium or the substantive storage medium includes, for example but not limited to, a random-access memory (RAM), a read-only memory (ROM), a flash memory, a solid-state drive (SSD) or other memory measures, a CD-ROM, a digital versatile disk (DVD), a Blu-ray (trademark registered) disk or other optical disk storages, a magnetic cassette, a magnetic tape, a magnetic disk storage or other magnetic storage devices. The program may be transmitted via a transitory computer-readable medium or a communication medium. The transitory computer-readable medium or the communication medium includes, for example but not limited to, a propagation signal in an electrical, optical, acoustic or other formats.

What is claimed is:

1. An image processing device communicatively connected to at least one terminal device, the image processing device comprising:
   a processor;
   a non-transitory computer storage medium that stores computer executable instructions that, when executed by the processor, cause the processor to implement:
   a distance information acquisition unit that acquires distance information representing a distance between the terminal device and the image processing device, based on a radio wave arriving from the terminal device;
   a direction information acquisition unit that acquires direction information representing a direction of the terminal device in relation to the image processing device, based on the radio wave arriving from the terminal device; and
   wherein the processor performs processing to perform image processing, when a position of the terminal device is within a predetermined range that is determined in advance in relation to the image processing device and a rate of change in at least one of the distance from the terminal device and the direction of the terminal device is equal to or lower than a threshold that is determined in advance, based on the distance information and the direction information,
   wherein
   with respect to a job for the image processing, whether the job is with or without authentication processing is designated, and
   in the case where a job corresponding to the terminal device is a job with authentication processing, the processor
   displays a screen for performing authentication processing, when the position of the terminal device is within a predetermined range that is determined in advance in relation to the image processing device, and the rate of change in at least one of the distance from the terminal device and the direction of the terminal device is equal to or lower than a threshold that is determined in advance, and
   executes the job when the authentication processing is successful.

2. The image processing device according to claim 1, wherein
   the processor performs processing to perform image processing, when at least the distance between the terminal device and the image processing device is equal to or shorter than a threshold that is determined in advance, and at least the rate of change in the direction of the terminal device is equal to or lower than a threshold that is determined in advance.

3. The image processing device according to claim 1, wherein
   the processor performs processing to perform image processing, when at least the direction of the terminal device in relation to the image processing device is within a predetermined range that is determined in advance, and the rate of change in at least one of the distance from the terminal device and the direction of the terminal device is equal to or lower than a threshold that is determined in advance.

4. The image processing device according to claim 1, wherein the processor performs processing to perform image processing, when a state where the rate of change in at least one of the distance from the terminal device and the direction of the terminal device is equal to or lower than a threshold that is determined in advance continues for a predetermined time that is determined in advance.

5. The image processing device according to claim 1, wherein identification information of a user of the terminal device is made to correspond to a job for the image processing, and the processor executes the job corresponding to the identification information of the user relating to the terminal device, when the position of the terminal device is within a predetermined range that is determined in advance in relation to the image processing device, and the rate of change in at least one of the distance from the terminal device and the direction of the terminal device is equal to or lower than a threshold that is determined in advance.

6. The image processing device according to claim 1, wherein the image processing device is communicatively connected to a plurality of terminal devices, the distance information acquisition unit acquires the distance information about each of the plurality of terminal devices, the direction information acquisition unit acquires the direction information about each of the plurality of terminal devices, and the processor waits for execution of a job for image processing, when the positions of the plurality of terminal devices are within a predetermined range that is determined in advance in relation to the image processing device, and the rate of change in at least one of the distance from each of the plurality of terminal devices and the direction of each of the plurality of terminal devices is equal to or lower than a threshold that is determined in advance, and executes the job, when the position of only the terminal device relating to the job waiting to be executed is within a predetermined range that is determined in advance in relation to the image processing device, or when only the rate of change in at least one of the distance from the terminal device and the direction of the terminal device is equal to or lower than a threshold that is determined in advance.

7. The image processing device according to claim 1, wherein the image processing device is communicatively connected to a plurality of terminal devices, the distance information acquisition unit acquires the distance information about each of the plurality of terminal devices, the direction information acquisition unit acquires the direction information about each of the plurality of terminal devices, and the processor executes a job relating to the terminal device nearest to the image processing device, when the positions of the plurality of terminal devices are within a predetermined range that is determined in advance in relation to the image processing device, and the rate of change in at least one of the distance from each of the plurality of terminal devices and the direction of each of the plurality of terminal devices is equal to or lower than a threshold that is determined in advance.

8. The image processing device according to claim 1, wherein with respect to a job for the image processing, whether the job is with or without authentication processing is designated, the image processing device is communicatively connected to a plurality of terminal devices, the distance information acquisition unit acquires the distance information about each of the plurality of terminal devices, the direction information acquisition unit acquires the direction information about each of the plurality of terminal devices, and the processor, in the case where the positions of the plurality of terminal devices are within a predetermined range that is determined in advance in relation to the image processing device, and the rate of change in at least one of the distance from each of the plurality of terminal devices and the direction of each of the plurality of terminal devices is equal to or lower than a threshold that is determined in advance, executes a job relating to the terminal device nearest to the image processing device, when a job to be executed is a job without authentication processing, and waits for execution of the job when the job to be executed is a job with authentication processing, and executes the job when the position of only the terminal device relating to the job is within a predetermined range that is determined in advance in relation to the image processing device or when only the rate of change in at least one of the distance from the terminal device and the direction of the terminal device is equal to or lower than a threshold that is determined in advance.

9. A control method executed by an image processing device communicatively connected to at least one terminal device, the control method comprising:

acquiring distance information representing a distance between the terminal device and the image processing device, based on a radio wave arriving from the terminal device;

acquiring direction information representing a direction of the terminal device in relation to the image processing device, based on the radio wave arriving from the terminal device; and performing processing to perform image processing, when a position of the terminal device is within a predetermined range that is determined in advance in relation to the image processing device and a rate of change in at least one of the distance from the terminal device and the direction of the terminal device is equal to or lower than a threshold that is determined in advance, based on the distance information and the direction information, wherein with respect to a job for the image processing, whether the job is with or without authentication processing is designated, and in the case where a job corresponding to the terminal device is a job with authentication processing, displaying a screen for performing authentication processing, when the position of the terminal device is within a predetermined range that is determined in advance in relation to the image processing device, and the rate of change in at least one of the distance from the terminal device and the direction of the terminal device is equal to or lower than a threshold that is determined in advance, and executing the job when the authentication processing is successful.

10. A non-transitory computer-readable storage medium storing a program, the program implementing a control method executed by an image processing device communicatively connected to at least one terminal device, the program causing a computer to execute:

acquiring distance information representing a distance between the terminal device and the image processing device, based on a radio wave arriving from the terminal device;

acquiring direction information representing a direction of the terminal device in relation to the image processing device, based on the radio wave arriving from the terminal device; and performing processing to perform image processing, when a position of the terminal device is within a predetermined range that is determined in advance in relation to the image processing device and a rate of change in at least one of the distance from the terminal device and the direction of the terminal device is equal to or lower than a threshold that is determined in advance, based on the distance information and the direction information, wherein with respect to a job for the image processing, whether the job is with or without authentication processing is designated, and in the case where a job corresponding to the terminal device is a job with authentication processing, displaying a screen for performing authentication processing, when the position of the terminal device is within a predetermined range that is determined in advance in relation to the image processing device, and the rate of change in at least one of the distance from the terminal device and the direction of the terminal device is equal to or lower than a threshold that is determined in advance, and executing the job when the authentication processing is successful.

* * * * *